US011863985B2

(12) United States Patent
Elliott et al.

(10) Patent No.: US 11,863,985 B2
(45) Date of Patent: *Jan. 2, 2024

(54) METHOD AND APPARATUS FOR DETECTING AND HANDLING EVIL TWIN ACCESS POINTS

(71) Applicant: WatchGuard Technologies, Inc., Seattle, WA (US)

(72) Inventors: Scott Elliott, Snoqualmie Pass, WA (US); Jay Lindenauer, Seattle, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,075

(22) Filed: Jul. 8, 2022

(65) Prior Publication Data

US 2022/0353686 A1 Nov. 3, 2022

Related U.S. Application Data

(63) Continuation of application No. 16/866,477, filed on May 4, 2020, now Pat. No. 11,432,152.

(51) Int. Cl.
*H04L 29/06* (2006.01)
*H04W 12/08* (2021.01)
(Continued)

(52) U.S. Cl.
CPC ........... *H04W 12/08* (2013.01); *H04L 9/0643* (2013.01); *H04W 12/12* (2013.01)

(58) Field of Classification Search
CPC ... H04W 12/08; H04W 12/12; H04W 12/122; H04L 9/0643; H04L 2209/805; H04L 9/12
See application file for complete search history.

(56) References Cited

U.S. PATENT DOCUMENTS 7,286,515 B2 * 10/2007 Olson ................. H04W 12/122
455/410
7,885,639 B1 2/2011 Satish et al.
(Continued)

FOREIGN PATENT DOCUMENTS

KR 101537800 B1 7/2015
WO 2016205815 A1 12/2016

OTHER PUBLICATIONS

First Office Action for U.S. Appl. No. 16/866,477, dated Dec. 2, 2021, 19 pages.
(Continued)

*Primary Examiner* — Joseph P Hirl
*Assistant Examiner* — Ka Shan Choy
(74) *Attorney, Agent, or Firm* — Compass IP Law PC

(57) ABSTRACT

Methods and apparatus for detecting and handling evil twin access points (APs). The method and apparatus employ trusted beacons including security tokens that are broadcast by trusted APs. An Evil twin AP masquerades as a trusted AP by broadcasting beacons having the same SSID as the trusted AP, as well as other header field and information elements IE in the beacon frame body containing identical information. A sniffer on the trusted AP or in another AP that is part of a Trusted Wireless Environment (TWE) receives the beacons broadcasts by other APs in the TWE including potential evil twin APs. The content in the header and one or more IEs in received beacons are examined to determine whether a beacon is being broadcast by an evil twin. Detection of the evil twin are made by one of more of differences in MAC addresses of trusted and untrusted beacons, time jitter measurements and replay detection using timestamps in the beacons, detection of missing security tokens in untrusted beacons and detection that a security token that is mimicked by an evil twin is invalid. In one aspect, the security token is stored in a vendor-specific IE in
(Continued)

trusted beacons that is generated by employing a secret key using a cryptographic operation operating on data in the beacon prior to the vendor-specific IE.

12 Claims, 22 Drawing Sheets

(51) Int. Cl.
    *H04L 9/06*     (2006.01)
    *H04W 12/12*     (2021.01)

(56) References Cited

U.S. PATENT DOCUMENTS

| | | | |
|---|---|---|---|
| 8,176,328 B2 | 5/2012 | Chen et al. | |
| 8,327,143 B2 | 12/2012 | Ilyadis | |
| 8,898,436 B2 | 11/2014 | Chaudhry et al. | |
| 10,699,545 B1 | 6/2020 | Chan et al. | |
| 2005/0141498 A1 | 6/2005 | Winget et al. | |
| 2008/0250498 A1 | 10/2008 | Butti et al. | |
| 2010/0070771 A1 | 3/2010 | Chen et al. | |
| 2011/0131651 A1* | 6/2011 | Shanmugavadivel | H04W 12/122 726/22 |
| 2012/0284517 A1* | 11/2012 | Lambert | H04W 12/06 713/169 |
| 2015/0082429 A1* | 3/2015 | Rangarajan | H04W 12/122 726/23 |
| 2016/0100315 A1* | 4/2016 | Schenkel | H04W 12/122 726/4 |
| 2017/0070881 A1 | 3/2017 | Sun et al. | |
| 2018/0176021 A1 | 6/2018 | Dooley et al. | |
| 2019/0116173 A1 | 4/2019 | Robison et al. | |
| 2019/0149994 A1* | 5/2019 | Van Antwerp | H04W 12/08 726/4 |
| 2019/0182663 A1 | 6/2019 | Wang | |
| 2019/0380043 A1 | 12/2019 | Hassan et al. | |
| 2020/0107197 A1* | 4/2020 | Kaushik | H04W 88/08 |
| 2020/0344677 A1 | 10/2020 | Cherian et al. | |
| 2021/0204135 A1 | 7/2021 | Cho et al. | |
| 2022/0232389 A1* | 7/2022 | Watts | H04W 12/122 |

OTHER PUBLICATIONS

Gast, Matthew S., "802.11 Framing in Detail—802.11 Wireless Networks_ The Definitive Guide", 2nd Edition [Book] Feb. 16, 2020 (Year: 2020).

Notice of Allowance for U.S. Appl. No. 16/866,477, dated Apr. 25, 2022, 10 pages.

* cited by examiner

Fig. 8a

| Signed Fields (ProbeResponseS) 802 | | | | | | Token 804 | |
|---|---|---|---|---|---|---|---|
| MAC Header 806 | 808 | Beacon Frame Body | | | | Requested | 806 |
| | All or Selected IEs | 810 | | | | Vendor Specific IE 812 | Elements |
| MAC (BSSID) | TIMESTAMP 818 | 820 SSID | # | SSID1 | Optional IEs... | Data 826 | **** |
| 03:04:05:06:07:08 | 12:12:12 | | | | Optional IEs Data... | Nonce TokenPR | |
| 814 | 816 | | | 822 | 824 | 828 830a | |

ProbeResponseS

TokenPR = Enc (Nonce || H(ProbeResponseS), K)

| Signed Fields (ProbeResponseS) 802 | | | | | | Token 804 | |
|---|---|---|---|---|---|---|---|
| MAC Header 806 | 808 | Beacon Frame Body | | | | Requested | 806 |
| | All or Selected IEs | 810 | | | | Vendor Specific IE 812 | Elements |
| MAC (BSSID) | TIMESTAMP 818 | 820 SSID | # | SSID1 | Optional IEs... | Data 826 | **** |
| 03:04:05:06:07:08 | 12:12:12 | | | | Optional IEs Data... | Nonce TokenPR | |
| 814 | 816 | | | 822 | 824 | 828 830b | |

HMAC Message m = ProbeResponseS

TokenPR = HMAC(ProbeResponseS), K)

800b

METHOD AND APPARATUS FOR DETECTING AND HANDLING EVIL TWIN ACCESS POINTS

CLAIM OF PRIORITY

The present application is a continuation of U.S. patent application Ser. No. 16/866,477, entitled "METHOD AND APPARATUS FOR DETECTING AND HANDLING EVIL TWIN ACCESS POINTS," filed May 4, 2020, for which the benefit of the priority date is claimed under 35 U.S.C. § 120 and for which the entirety is incorporated by reference herein.

FIELD OF THE INVENTION

The field of invention relates generally to securing data networks and, more specifically but not exclusively relates to detecting evil twin access points (APs) in a protected Wireless Environment and other methods to create a Trusted Wireless Environment (TWE).

BACKGROUND INFORMATION

The use of wireless communication in today's environments is ubiquitous. It seems that everyone has at least one "smart" wireless device, such as a smart phone or tablet, and many have other types of mobile computing devices, such as laptops, notebooks, Chromebooks, etc., that support wireless communication. In addition to cellular and mobile computing, wireless communication technologies are used for other purposes, such as audio systems, portable telephone systems, screen casting, and peer-to-peer communication to name a few.

The most common wireless technologies include Wireless Wide Area Networks (WWAN) (e.g., LTE, HSPA+, UMTS, GPRS, generally associated with cellular networks), Wireless Local Area Networks (WLAN), including Institute of Electrical and Electronics Engineers (IEEE) 802.11a, 802.11b, 802.11g, 802.11n, 802.11ac standards (commonly referred to as Wi-Fi™ WLANs) and Wireless Personal Area Networks (WPAN), such as Bluetooth™. The focus of this disclosure is 802.11-based Wi-Fi™ WLANs and associated equipment. For convenience, these may be referred to herein as 802.11 networks, Wi-Fi™ networks, 802.11 Access Points (APs), Wi-Fi™ APs, etc.

Public Wi-Fi™ networks are widespread, such as in coffee shops, cafes, stores, airports, subways, as well as public offices and companies. Each connection to a Wi-Fi™ networks is made via an AP, commonly referred to as "hotspots" or "Wi-Fi™ hotspots". A wireless access point may be a wireless router, another computer connected to the network, or any device that allows a computer to connect to the network. The network may be the Internet, a local area network (LAN), a wide area network (WAN), home network, corporate intranet, ad hoc network or any computer network. The wireless AP broadcasts a service set identifier (SSID) identifying the presence of a wireless network. From a user viewpoint, the SSID is the name associated with the wireless network.

As the number of wireless access points has increased, cybercriminals have developed methods to intercept information destined for these wireless APs. One such threat to the security of a wireless access point is known as the "evil twin" access point. The cybercriminal deploys a wireless AP that broadcasts the same SSID as a known wireless access point, often with stronger signal strength. For convenience, mobile devices are commonly set up (by users) to automatically reconnect to known networks identified by their SSIDs, e.g., an SSID with the same name as a previously connected to SSID. Mobile devices are also typically set to connect to a known SSID broadcasting the strongest signal. Because the evil twin access point is broadcasting the same SSID as a known wireless access point and (oftentimes) at a stronger signal strength, the mobile device may automatically connect to the evil twin AP instead of the legitimate wireless AP. Evil twin APs may also mimic the MAC (Media Access Channel) address of the legitimate AP.

Although Wi-Fi™ networks have long supported security mechanisms, including WPA (Wi-Fi Protected Access), WPA2 and (just recently) WPA3, such measures are inconvenient for users and are often not used for public Wi-Fi™ networks. For example, if a security mechanism such as WPA or the like is used at a coffee shop, store, airport, etc., the user will need to obtain the password to access the network. Therefore, many Wi-Fi™ APs are used without security.

Under WPA and WPA2, once connected, communications between the Wi-Fi™ APs and the user mobile device are encrypted. Conversely, such communications on non-secure Wi-Fi™ networks are "in the clear," meaning they are not encrypted. Accordingly, once the mobile device is connected to an evil twin AP of a non-secure legitimate AP, the cybercriminal has access to information contained in communications originally intended for the legitimate AP. This information may include credit card information, usernames and passwords, and other sensitive information. The cybercriminal can also use the evil twin AP to infect the mobile devices such as notebooks and laptops with a computer virus or other malware. Because the evil twin AP broadcasts the same SSID as the legitimate AP (as well as other beacon matching information), the user is unaware he or she has connected to the evil twin wireless access point and that communications are being accessed by the cybercriminal.

Evil twins may also be set up to establish "man-in-the-middle" (MitM) positions, and extract sensitive information, often without leaving any traces behind. For example, the evil twin AP may supply Internet service through 4G LTE connections (rather than a wired network connection) to evade network security. Once in a MitM position, the attacker has complete control over the Wi-Fi™ session. These cybercriminals can leverage well-known tools to duplicate popular login forms for social sites or email hosting platforms, intercept the credentials in plain text, forward them to the real websites, and log in the user. As the target, the users believe they have simply logged in to their email accounts, while in reality the users have handed over their credentials to an attacker.

Many APs are configured to use WPA2-Personal, which requires a password or passphrase to connect to the AP. An evil twin AP may masquerade as a secure AP and query the user/user device for a password or passphrase while accepting anything entered by the user. As with an evil twin for an unsecure AP, the user is unaware he or she is connected to the evil twin. In addition, once armed with the password/passcode for the legitimate secure AP, an operator of the evil twin may connect to that secure AP and use communication facilities provided by the secure AP.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3a is a diagram illustrating the format of a trusted beacon frame, according to a first embodiment;

FIG. 3b is a diagram illustrating the format of a trusted beacon frame, according to a second embodiment;

FIG. 8a is a diagram illustrating the format of a trusted probe response, according to a first embodiment;

FIG. 8b is a diagram illustrating the format of a trusted probe response, according to a second embodiment;

DETAILED DESCRIPTION

Figure 1:
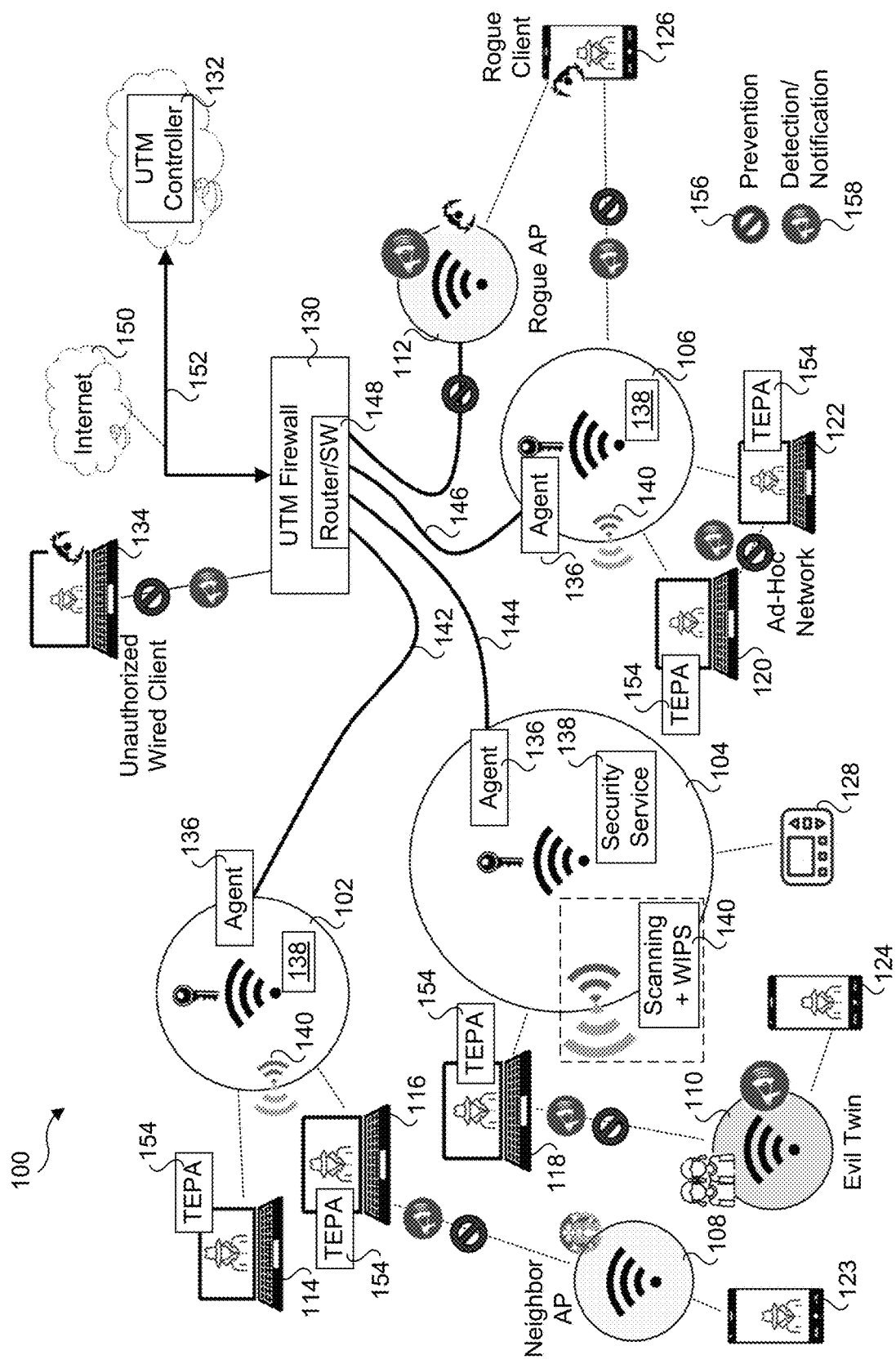
FIG. 1 is a schematic diagram of a trusted wireless environment (TWE) including a mix of trusted and untrusted access points to which one or more clients are coupled.

Embodiments of methods and apparatus for detecting and handling evil twin access points are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Definitions 802.11 family of specifications: Specifications and/or standards published by the IEEE under IEEE 802.11 (WIRELESS LOCAL AREA NETWORKS).

Client: Any endpoint device on a network. Examples include computers, mobile devices, and IoT devices. Clients are also known as stations.

Endpoint: synonym for Client or Station

Access Points (AP): An AP configured to operate in accordance with an 802.11 specification/standard.

Node: A generalized term for any device in the network. In a wireless network this may include but is not limited to an AP and a Client.

RF Space: The three-dimensional space where two or more wireless devices may detect communications from one to the other device with sufficient signal strength to allow digital communications. Any two nodes may create a non-congruent RF Space that may or may not form a partial union with another space.

HMAC (Hash-based Message Authentication Code) Hash Function: Any function that can be used to map data of arbitrary size to fixed-size values.

Cryptograph Hash Function: A hash function that is suitable for use in cryptography. A mathematical algorithm that maps data of arbitrary size to a bit string of a fixed size and is a one-way function.

Beacon: A beacon refers to beacon as defined in the 802.11 family of specifications or other communications protocol.

Trusted Beacon: A beacon that includes security information Probe Request: An IEEE 802.11 Endpoint Request for a Probe Response. A Probe
Request may contain much of the same information as a Beacon.
Trusted Probe Request: A Trusted Probe Request adds security information as defined herein.
Probe Response: An IEEE 802.11 response to a Probe Request.
Trusted Probe Response: A Probe Response to a Trusted Probe Request Rogue AP: An AP that is connected to a protected network that does not support transmitting a Trusted Beacon.
Neighbor AP: An AP that shares at least some RF space with a protected network, yet the neighbor is not part of the protected network and does not share the same SSID as the protected network.
Protected Networks
Deauthentication Frame: A Station or AP can send a Deauthentication Frame when all communications are terminated (when disassociated, still a station may still be authenticated to the cell). Deauthentication Frame may be referred to as deAuth or Deauth frames herein.
Deauthentication Attack: DeAuth Attacks are cyber-attacks to force a client to re-associate, that may, for example, make the client vulnerable to associating with an Evil Twin.
Disassociation Frame: Once a station associated to an AP, either side can terminate the association at any time by sending a disassociation frame. It has the same frame format as deauthentication frame. A station can send a disassociation frame causing it to leave the current cell and roam to another cell. An AP could send disassociation frame causing the station try to use invalid parameters.
MitM Attack: In cryptography and computer security, a man-in-the-middle attack (MITM) is an attack where the attacker secretly relays and possibly alters the communications between two parties who believe that they are directly communicating with each other.
Protected Wireless Networks: A Wireless network that places Tokens in some packets and scans for them.
Trusted Endpoint Agent—TEPA
A Trusted Endpoint Agent (TEPA) is a program running on a client device such as a PC, smart phone, printer, IoT device, to monitor and assure secure communications with access points or other network devices. A TEPA may be combined with other programs, such as Endpoint Agents or otherwise built into the device such as in the operating system, drivers or endpoint hardware or a combination there of.
Sniffing: Listening for and/or decoding management frames and communication packets. Sniffing devices may be independent devices or may be combined within other network module(s). For example, an AP may use its 802.11 radio to sniff or may have an additional 802.11 radio dedicated to sniffing.
Security Remediation: Security remediation is an action in response to a detected intrusion, such the detection of an evil twin. The step or steps taken when a security issue is detected include, but are not limited to logging the event, alerting users and/or administrators, transmitting deauth packets, sandboxing users and/or APs, and/or terminating wireless access of clients, APs routers, servers and or the entire network.

Wireless Environment: Within common RF ranges to be able to communicate between at least two wireless devices at least unidirectionally.
Protected, Trusted, and Authorized APs: APs that are capable of transmitting a valid Token.
Evil Client: An unauthorized client that issues a Probe Request to a protected SSID that lacks a valid Token in the probe request. Malicious uses of Evil Clients include Denial of Service Attacks, and Oracle Attacks against WiFi pass phrases.
Evil Twin AP: Evil Twins are Access Points in the same RF environment as a protected network that impersonate an authorized AP with one or more of the following characteristics:
Transmits the same SSID as the protected devices
Transmits the same MAC address (BSSID) as a protected AP
Evil Node: The generalized case if either as Evil Twin AP or Evil Twin Endpoint.
Security Appliance: A device in a network that is able to provide security services to a network. Non-limiting examples of Security Appliances include firewalls and the like.
Keys: Keys, in this application, refers to cryptographic keys that are shared between two or more nodes to facilitate secure communication between these nodes. The system may have more than one set of keys. Keys may be pre-shared, exchanged though public keys, a public key infrastructure, certificates or other means. Keys may be symmetric or asymmetric.
Wireless Network: two or more nodes (i.e., wireless-enabled devices) that communicate wirelessly using RF signals that are transmitted over a shared wireless media.

FIG. 1 shows a trusted wireless environment (TWE) 100 including a plurality of access points to which one or more client devices (referred to as clients for simplicity) are coupled. The APs include three authorized APs 102, 104, and 106, each having the configuration shown for authorized AP 104. Authorized APs are also referred to as protected APs and trusted APs. TWE 100 further includes a neighbor AP 108, an evil twin AP 110, and a rogue AP 112. The wireless clients include protected clients 114, 116, 118, 120, and 122, mobile phone clients 123, 124, and 126, and an Internet of Things (IoT) device 128.

Generally, TWE 100 is illustrative of a private environment, a public environment, or a mixed private/public environment that includes one or more trusted APs and/or sniffers described herein. Each of the APs illustrated in FIG. 1 is an IEEE 802.11 access point employing one or more of IEEE 802.11a, 802.11b, 802.11g, 802.11n, 802.11ac standards and/or future 802.11 or Wi-Fi™ standards. Each AP will have a respective coverage area that is generally a function of the particular 802.11 PHY (Physical Layer) protocol, transmitter broadcast strength and radio signal propagation characteristics of the environment. For example, different APs may be in separate rooms or buildings, on different floors, etc. Generally, the radio signals broadcast from the various APs may overlap, enabling a given AP to detect radio signals broadcast by one or more other APs in the RF space, and enabling clients at given locations to connect to one or more APs.

Security Facilities

Each authorized AP 102, 104, and 106 include an agent 136, a security service 138, and a scanning+WIPS (Wireless Intrusion Prevention System) module 140. Each agent 136 is linked in communication with a Unified Threat Management (UTM) firewall 130 via a respective link, as depicted by links 142, 144, and 146. In one embodiment, UTM firewall 130 includes a built-in router or switch 148 and links 142, 144, and 146 are Ethernet links. In one embodiment, agents 136 communicate with UTM firewall 130 using a secure protocol over TCP/IP, such as SSL (Secure Sockets Layer) and/or HTTPS. UTM firewall also provides access to external network resources (e.g., Web pages, Web services, data centers, etc.) accessed via one or more networks including the Internet 150. As further shown in FIG. 1, UTM firewall 130 is linked in communication with UTM cloud controller 132 via a VPN link 152.

As described and illustrated in further detail below, authorized APs 102, 104, and 106 are operated in a coordinated manner using a distributed set of security components including agents 136, security services 138, and scanning+ WIPS modules 140. In addition to these security components, security aspects may be implemented in clients, such as implemented by trusted end-point agents (TEPA) 154 for protected clients 114, 116, 118, 120, and 122.

In addition to other security functions/operations, the distributed security components provide prevention and/or detection and notification, as depicted by the prevention icons 156 and the detection/notification icons 158. Prevention means clients are prevented from establishing connections with certain APs and prevented from establishing ad-hoc networks. Detection and notification comprise detecting certain types of APs and clients, as well as detecting attempts by clients to connect to unauthorized APs and providing corresponding notifications to application security components in the system. For example, detection and notification may include one or more of logging detected events, providing notification of detected events (e.g., alerts) to UTM cloud controller 132 and/or push notifications to registered management and/or operator devices, as well as other types of notifications.

Unauthorized APs include neighbor APs, evil twin APs, and rogue APs. Generally, a neighbor AP is an AP in a wireless environment that has a coverage area that overlaps with the coverage area of one or more authorized APs but is operated in a normal, non-malicious manner. Examples of neighbor APs include APs hosting public hotspots, such as an AP at a STARBUCKS™ coffee shop. An otherwise authorized AP with a misconfigured pre-shared key (PSK) is handled in a similar manner to a neighbor AP described and illustrated herein.

A rogue AP is an AP that has been coupled to a network to which one or more authorized APs are coupled, but is not configured to operate (or is not operated) as an authorized AP. For example, an employee located in an office with a weak wireless connection might chose to bring in his or her own AP and connect it to the company's Ethernet LAN or WAN (i.e., corporate network). For performance and security reasons (among others), most enterprise companies have wired networks to which various computers are connected, such as desktops, workstations, and servers. It is common to have an Ethernet (RJ45) jack in the wall of each office or cubicle, and/or otherwise there are multiple Ethernet jacks scattered throughout the enterprise office space. Without security measures, an employee can simply connect an AP to the corporate network via an Ethernet cable. Even when some types of security measures are in place, an employee may configure an AP to appear on the corporate network as a client end-point device that has been authenticated. Also, a personal computer, laptop, notebook, etc. may be set up to act as an AP.

Evil twin APs are discussed above. Generally, an evil twin AP will be deployed in a public location, although there are instances in which evil twin APs are deployed in corporate environments. In addition, an evil twin AP may be deployed in a private location that is near a corporate environment such that the evil twin AP is accessible to user devices within the corporate environment (with appropriate antennas and/or signal amplification evil twins may be located at a substantial distance from a corporate or private location).

In some instances, an unauthorized wired client such as a laptop, notebook, or desktop computer will attempt to connect to an Ethernet network to which UTM firewall 130 is connected. As depicted by an unauthorized wired 134, the attempted connection is both detected and establishment of a connection to the Ethernet network is prevented.

Figure 1A:
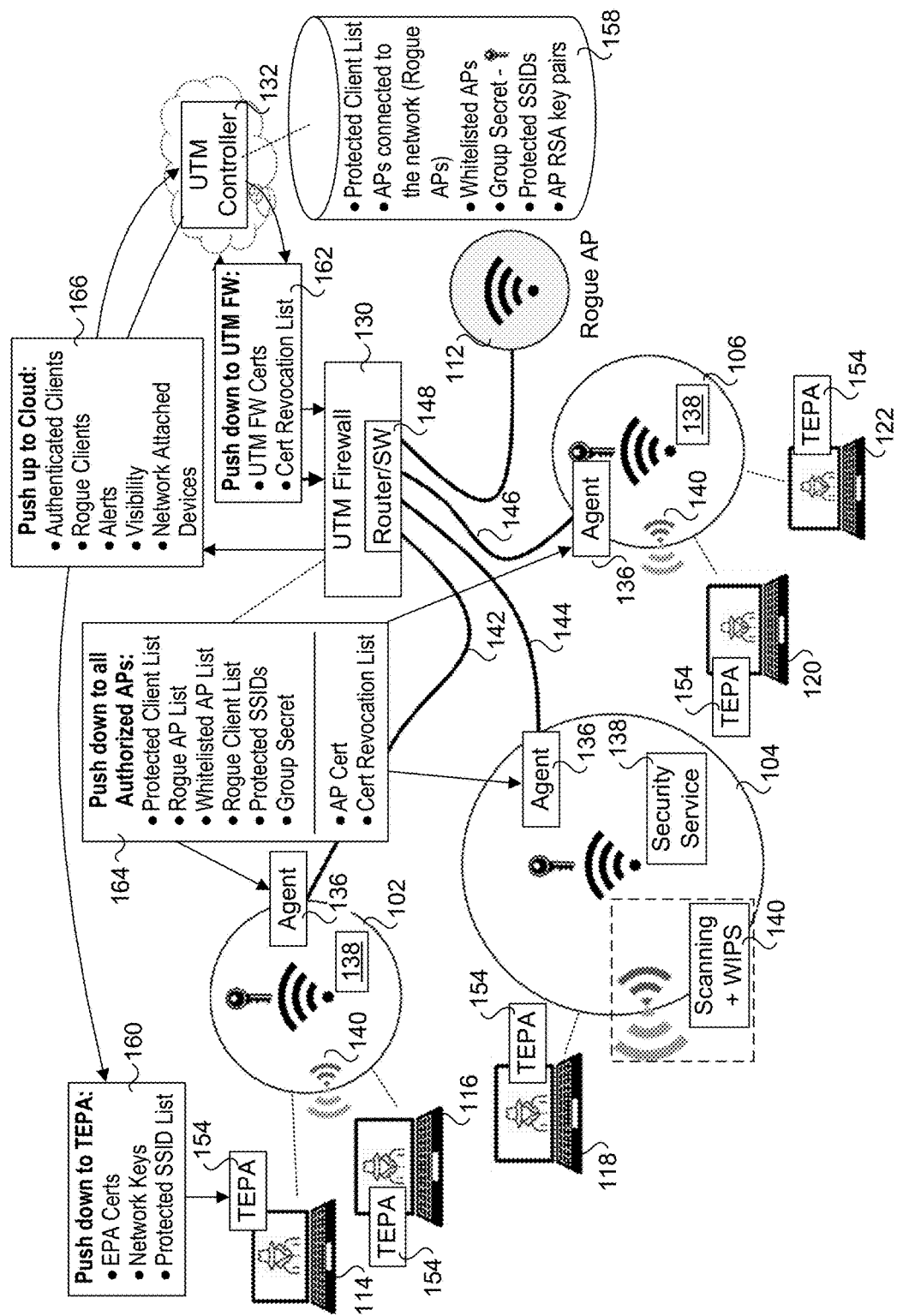
FIG. 1a is a schematic diagram illustrating further details of the TWE of FIG. 1 relating to provisioning security data.

FIG. 1a shows further aspects relating to provisioning of security-related data. UMT cloud controller maintains a database 158 in which various security information is stored, as depicted by a protected client list, a list of APs connected to the network (e.g., rogue APs), whitelisted APs, a group secret, a list or protected SSIDs and AP RSA key pair. The protected client list is a list of protected clients (e.g., clients that are protected using security measures associated with and/or managed by UTM cloud controller 132 and UTM firewall 130). Whitelisted APs are APs that are trusted APs, which may generally include authorized APs. A group secret is a secret that is distributed to the authorized APs and may take various forms including a key. Protected SSIDs is a list of SSIDs that are used by APs that are protected, such as authorized APs. AP RSA key pairs are pairs of RSA (Revest-Shamir-Adleman) keys that are used by the authorized APs, which include a public encryption key and a private (secret) decryption key. As an option, other cryptographic key systems may be used.

UMT cloud controller 132 pushes down client TEPA configuration data 160 to the TEPA 154 for protected clients 114, 116, 118, 120, and 122, which includes EPA (end-point agent) certificates, network keys, and the protected SSID list. UMT cloud controller 132 also pushes down security data 162 to UTM firewall 130 including UTM Firewall certificates and a certificate revocation list. UMT firewall 130 pushes down authorized AP configuration data 164 to each of authorized APs 102, 104 and 106 including a protected client list, a rogue AP list, the whitelisted AP list, a rogue client list, the list of protected SSIDs, and the group secret. The AP configuration data 162 may also include an AP certificate and a certificate revocation list. UMT firewall 130 also acquires various information about AP and clients in TWE 100 and pushes corresponding system information 166 to UTM controller 132 including a list of authenticated clients, a list of rogue clients, system alerts, visibility data, and devices attached to the network.

Returning to FIG. 1, the instances of TEPA 154 on protected clients 114, 116, 118, 120, and 122 enables these clients to establish secure communication sessions with authorized access points 102, 104, and 106. TEPA 154 may also prevent a protected client from establishing a communication session with an unauthorized AP while connected Detection of Evil Twins using Trusted Beacons IEEE 802.11 APs periodically transmit a management frame called a beacon frame or simply "beacon" for short. 802.11 beacons contain information about the network including capabilities and configuration information, serve to announce the presence of a wireless LAN and are used to synchronize the members of a service set.

Figure 2:
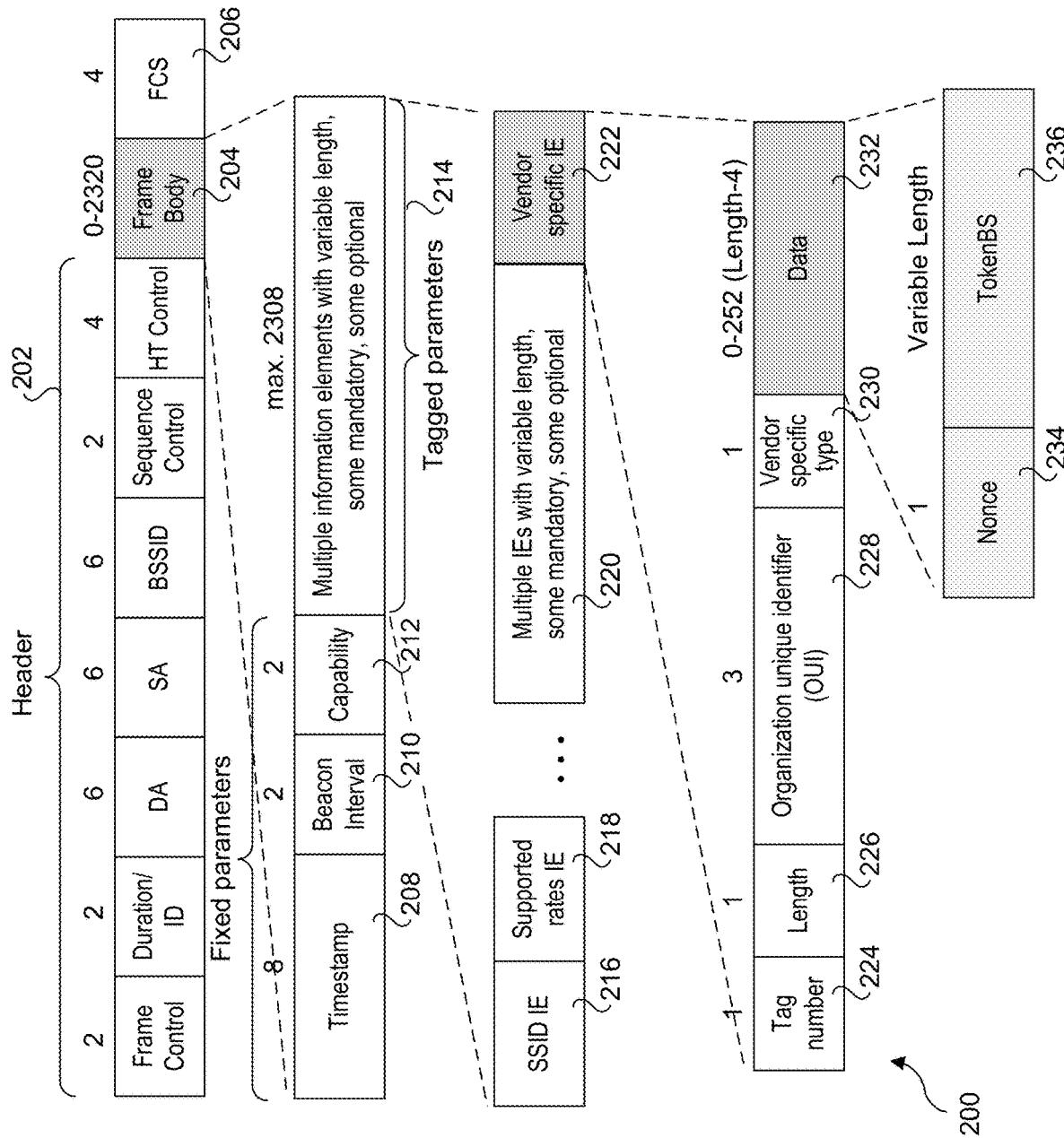
FIG. 2 is a diagram illustrating the format of an IEEE 802.11 beacon frame including a vendor-specific element containing a nonce and a secure token.

FIG. 2 shows the basic structure of an 802.11 beacon frame 200. The number shown above most elements is the number of Octets used by the element, where an Octet is 8-bits in length (1 Byte) (noting each element is also identified by a numerical value). Beacon frame 200 includes a 28-Octet header 202, a frame body 204 having a length of 0-2320 Octets, and a 4-Octet FCS (frame check sequence) 206. Frame body 204 has three fixed parameters including a 16-bit timestamp 208, 16-bit beacon interval 210, and a 16-bit capability information field 212. The fixed parameters are followed by tagged parameters 214 comprising multiple information elements (IEs) having variable lengths, some mandatory and some optional.

Required tagged parameters 214 shown for beacon frame 200 include an SSID IE 216 (commonly referred to as the SSID), and a supported rates IE 218. Also shown are multiple mandatory and optional IEs 220 having variable lengths, followed by an optional vendor-specific IE 222. Vendor-specific IE 222 includes an 8-bit tag number 226, an 8-bit length 226, a 24-bit organization unique identifier (OUI) 228, an 8-bit vendor-specific type 230, and a data element 232 have a length from 0-252 Bytes.

Under one embodiment for detecting the presence of an evil twin AP, authorized APs transmit "trusted" beacons including an encrypted "secure" token that employs a hash over a concatenation of data in selected beacon elements or over the whole beacon except for the vendor-specific IE. The beacon header fields and body frame IEs that are hashed are collectively referred to as BeaconS, and the secure token is referred to as TokenBS. As shown in FIG. 2, in one embodiment data element 232 in vendor-specific IE 222 includes a combination of a nonce 234 and a TokenBS 236 that are used by the trusted beacon.

Figure 3C:
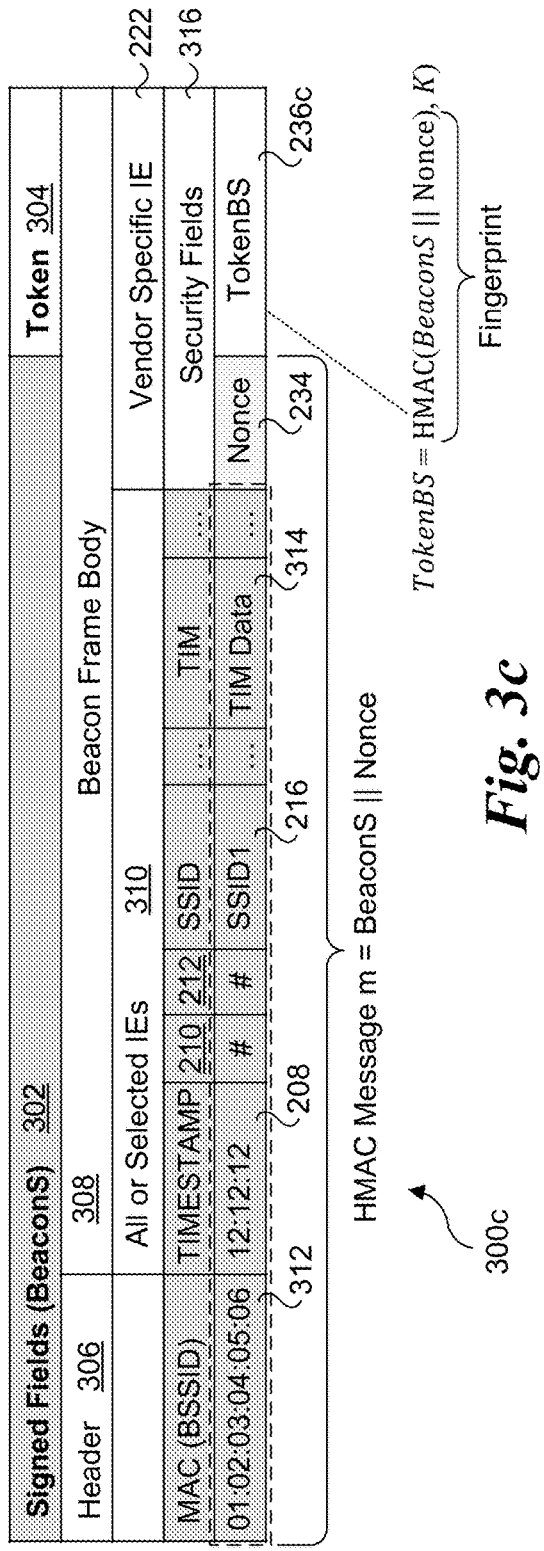
FIG. 3c is a diagram illustrating the format of a trusted beacon frame, according to a third embodiment.

FIGS. 3a, 3b, and 3c show respective embodiments of trusted beacons 300a, 300b, and 300c. For illustrative purposes, only selected IEs of the trusted beacons are shown; it will be recognized that the actual trusted beacons would include additional IEs that are not shown for clarity.

As shown in FIG. 3a, trusted beacon 300a includes a set of signed fields referred to as BeaconS 302 and a token 304. BeaconS 302 includes the beacon header 306 and the beacon body frame 308, the latter of which includes all or selected IEs 310 and a vendor-specific element 222 or all IEs. Generally, the trusted beacon will include any required IEs, applicable optional IEs (including vendor-specific element 222) and potentially other optional IEs. As shown in for fourth and fifth rows of FIG. 3a the header fields include the MAC address 312 (called the BSSID), and the IEs include a timestamp 208, beacon interval 210, capability 212, SSID 216, and a Traffic indication map (TIM) 314. The ellipses ' . . . ' reference other IEs. Depending on the IEEE 802.11-based PHY and other settings, various additional required IEs will be present in the trusted beacons. Optional IEs for a given implementation may also be present.

Following these required and optional IEs is vendor-specific IE 222 having a data element 232 used for a nonce 234 and a TokenBS 236a. In this embodiment, TokenBS=$Enc(Nonce\|H(BeaconS),K)$, where the BeaconS fields/content is hashed using a hash function H, concatenated with the (preceding) Nonce, and then encoded using key K. In some embodiments the hash function is a cryptographic hash function such as MD5, SHA-1, SHA-2, SHA-3, BLAKE2, BLAKE3, etc. although more generally any hash function may be used, such as a simple hash.

Under the embodiments of trusted beacons 300b and 300c in FIGS. 3b and 3c, an HMAC is used for TokenBS 236b and 236c:

TokenBS=$HMAC(BeaconS,K)$ where K is the HMAC key and the HMAC message m used for TokenBS 236b includes BeaconS while the HMAC message m used for TokenBS 236c includes the concatenation of nonce 234 and BeaconS.

Figure 2A:
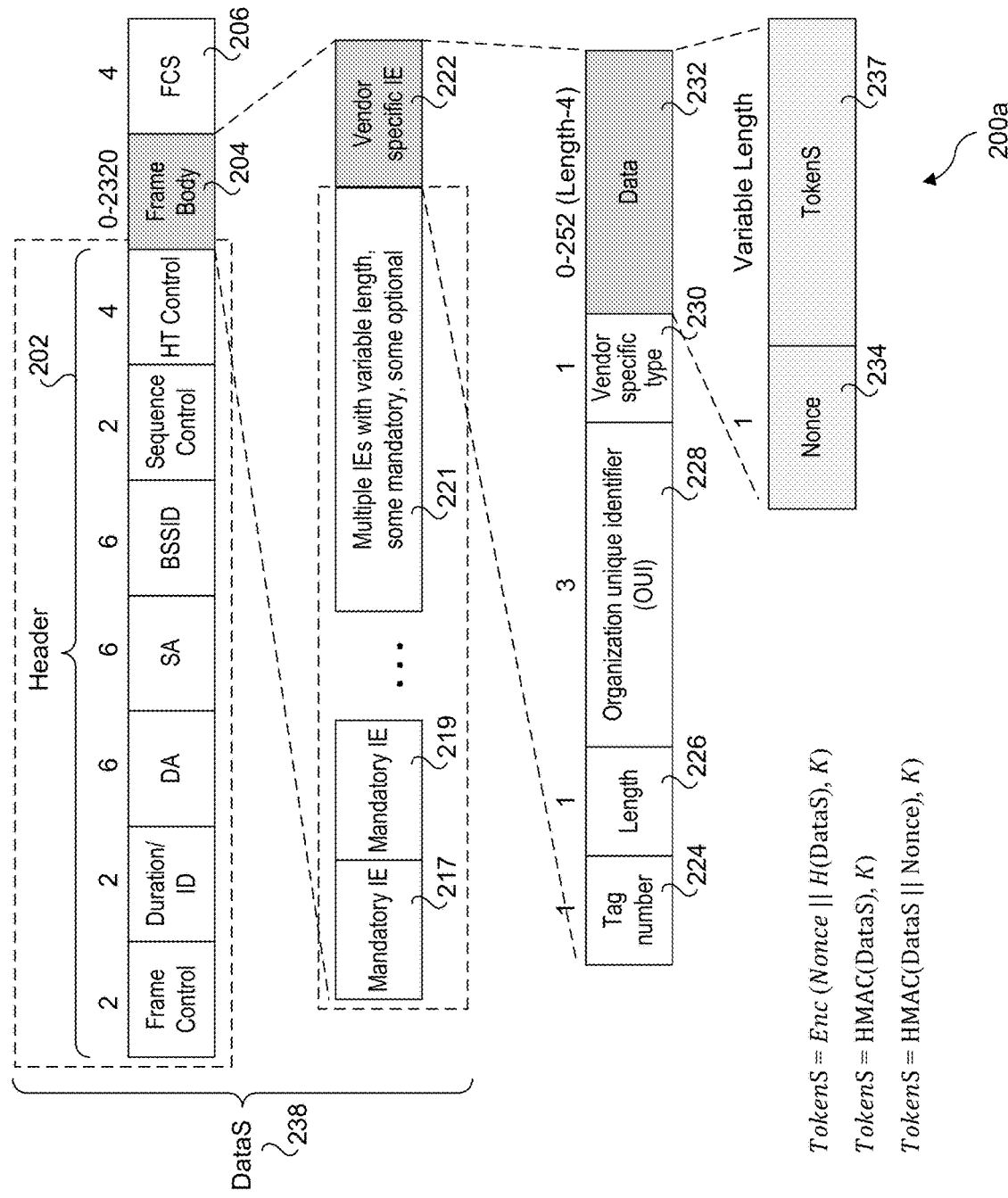
FIG. 2a is a diagram illustrating the format of a generic IEEE 802.11 management frame including a vendor-specific element containing a nonce and a secure token.

The use of secure tokens implemented in trusted beacons 300a, 300b, and 300c can be applied to other types of management frames, including but not limited to probe requests, probe responses, authentication frames, and associated frames (requests and responses). For example, FIG. 2a shows a generic management frame format 200a. Since a beacon frame is a type of management frame, the header 202, frame body 204, and FCS 206 are the same as shown in FIG. 2. Frame body 204 will begin with one or more mandatory IEs, as depicted by required IEs 217 and 219, followed by multiple IEs 221 with variable lengths, some mandatory, some optional, where the mandatory IEs are dependent on the particular type of management frame and other settings. IEs 221 will be followed by vendor-specific IE 222, which is the last IE for most management frames, with an exception being probe responses, as illustrated below in FIGS. 8a, 8b, and 8c.

As shown in the lower left of FIG. 2a, the following generalized token formulas are defined:

TokenS=$Enc(Nonce\|H(DataS)),K)$

TokenS=$HMAC(DataS),K)$

TokenS=$HMAC(DataS\|Nonce),K)$

In cryptographic hashes such as MD5, SHA-1, etc., the data to be hashed is referred to as "data"; in FIG. 2a this data is DataS 238, which may generally comprise a concatenation of data in multiple fields, or in the case of management frames, data in multiple IEs. As shown by DataS 238, in some embodiments the message m data will include all of the management frame content prior to vendor-specific IE 222. Optionally, selected IEs among all the IEs may be used. The token that is calculated will be included in a TokenS field 237 of data field 232. In this example, the TokenS follows a nonce 234. Alternatively, a nonce is not used, and the token occupies all of data field 232 for vendor-specific IE 222.

The HMAC algorithm is defined in RFC 2104. HMAC uses a cryptographic hash function 'H' and a secret key 'K'. An iterative cryptographic hash function such as MD5 or SHA-1 may be used to calculate the HMAC. When MD5 or SHA-1 are used, the resulting MAC algorithm is called HMAC-MD5 or HMAC-SHA-1, for instance; however, the embodiments are not limited to HMAC-MD5 or HMAC-SHA-1, but rather may use any cryptographic hash function suitable for use in an HMAC algorithm. The cryptographic strength of the underlying hash function, along with the size and quality of the key and the size of the hash output length in bits, define the cryptographic strength of the HMAC.

The HMAC function definition is, $$HMAC(K, m) = H((K' \oplus opad)\|H((K' \oplus ipad)\|m))$$

$$K' = \begin{cases} H(K) & K \text{ is larger than block size} \\ K & \text{otherwise} \end{cases}$$

where:
H=Cryptographic hash function
m=Message to be authenticated
K=Secret key padded with extra 0's (ipad/opad) to the block size of the hash function.

K' is a block-sized key derived from the secret key

∥ denotes concatenation

⊗ denotes bitwise exclusive or (XOR)

opad is the block-sized outer padding, consisting of repeated bytes valued 0x5c ipad is the block-sized inner padding, consisting of repeated bytes valued 0x36

Figure 4:
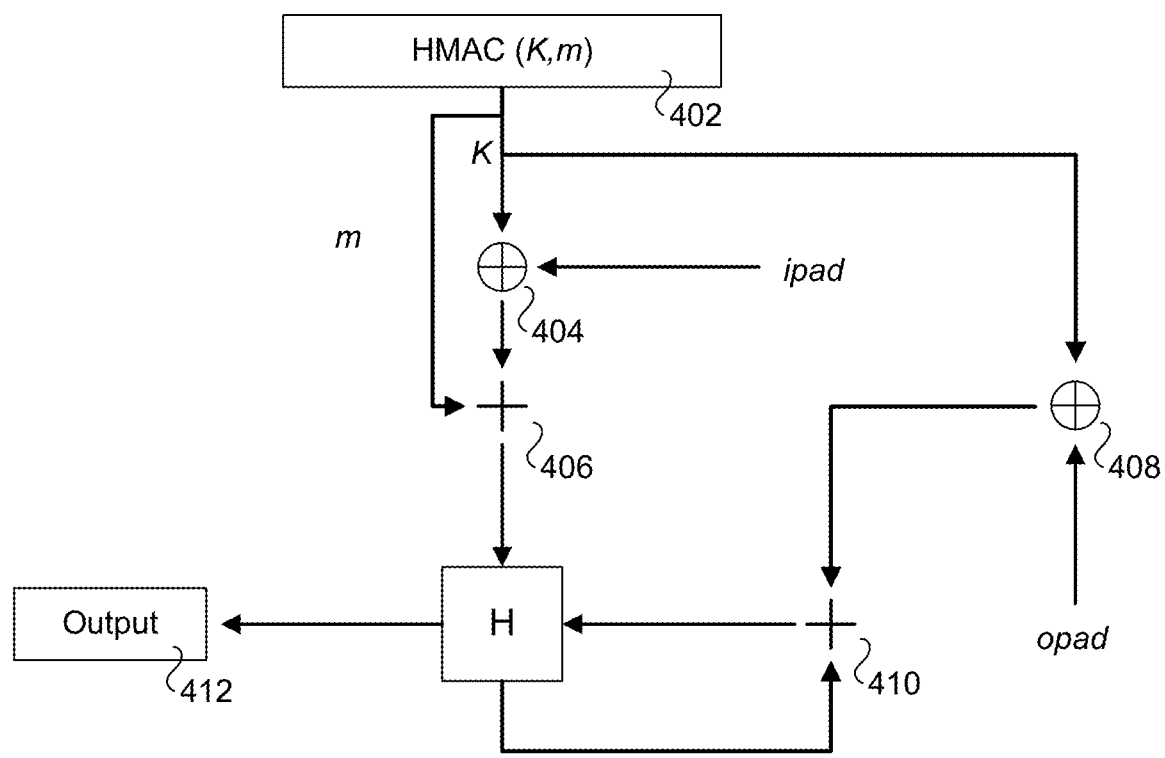
FIG. 4 is a diagram of an HMAC algorithm.

FIG. 4 shows a graphical representation of the HMAC algorithm. HMAC block 402 includes the secret key K and message m. Key K and the ipad are provided as inputs to an XOR block 404, which outputs the XOR result (1 or 0) to a summation block 406. Message m is also feed into summation block 406. The output of summation block 406 is provided as an input to hash function H. Key K and the opad are provided as inputs to an XOR block 408, which output the XOR result (1 or 0) to a summation block 410. The second input to summation block 410 is an output from hash function 'H'. Hash function 'H' also produces an output 412.

Figure 5:
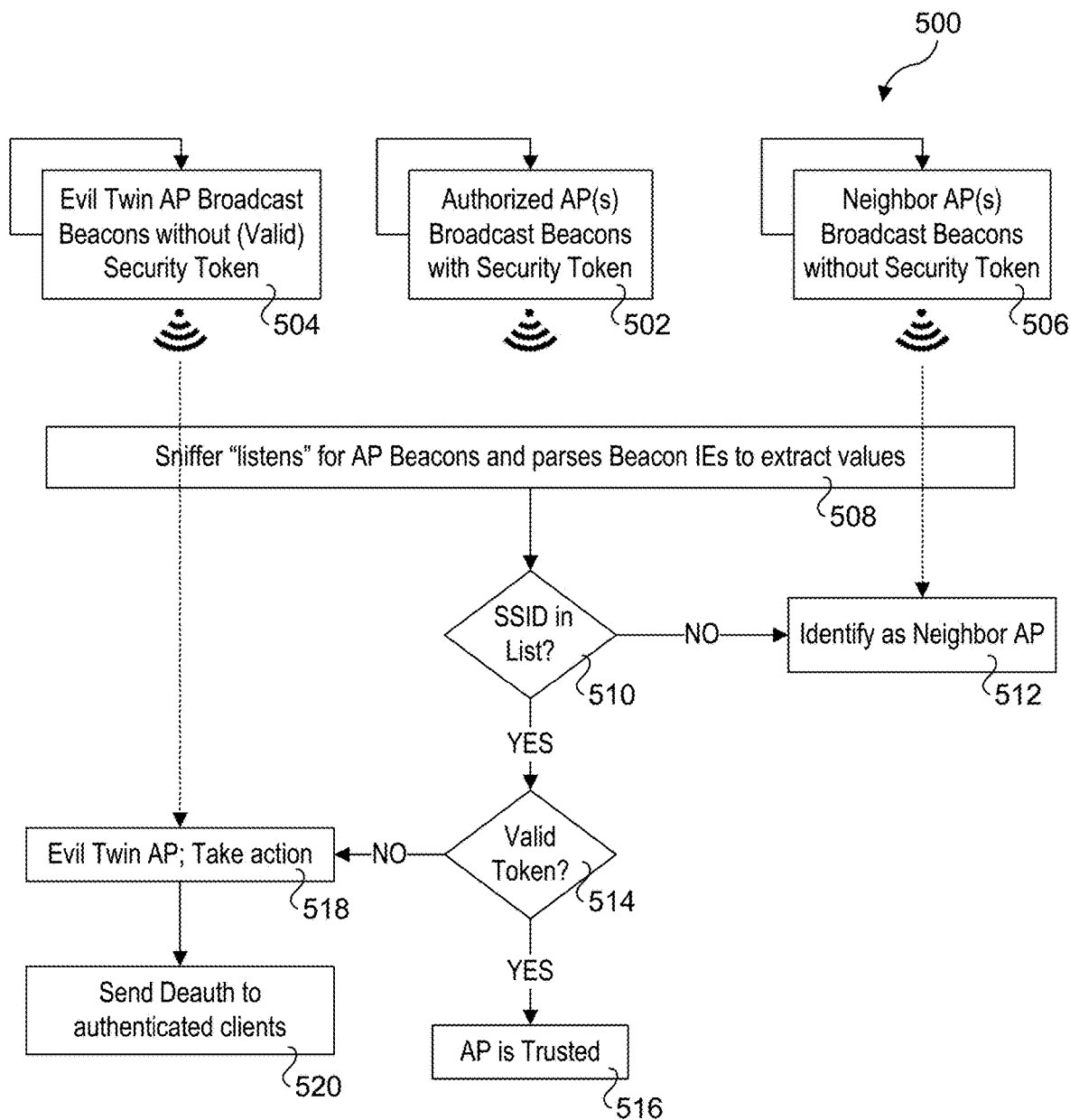
FIG. 5 is a diagram illustrating operations and logic implemented by an "sniffer" to detect evil twin APs, according to one embodiment.

FIG. 5 shows a diagram 500 illustrating operations and logic implemented by an "sniffer" to detect evil twin APs, according to one embodiment. Generally, a sniffer may be implemented in a stand-alone network element or an existing network element such as an authorized AP. In one embodiment sniffers are implemented in scanning+WIPS modules 140 in FIGS. 1 and 1a.

As shown in a block 502, authorized AP(s) broadcast beacons with security tokens on a periodic and repeated basis (e.g., as defined by the beacon interval IE). Concurrently, an evil twin AP periodically broadcasts beacons without security tokens or without a valid security token. As discussed above, an evil twin AP will attempt to mimic a legitimate AP (in this case an authorized AP)—the level of mimicking may vary, from a minimum level under which the SSID of a legitimate AP is mimicked, to a more advanced level under which an evil twin AP will mimic additional aspects, such as the MAC (BSSID) address of the legitimate AP. Some evil twins APs may mimic the beacons of a legitimate AP, under which case the entire beacon content will be copied. This will result in the evil twin AP broadcasting a beacon with a security token, but that token and/or the beacon will be invalid, as described below.

If a neighbor AP is present, the neighbor AP will also periodically broadcast beacons without security tokens, as shown in a block 506.

As shown in a block 508, the sniffer "listens" for AP beacons and parses the beacon IEs to extract their values. In this example, the sniffer will be listening for beacons transmitted by one or more authorized APs, an evil twin AP, and a neighbor AP. In a decision block 510, the sniffer determines whether the SSID is in its protected list. For example, the protected list may contain a list of authorized APs. A neighbor AP will have an SSID that is not in the protected list, and thus the answer to decision block 510 will be NO and the logic will proceed to a block 512 in which the neighbor AP is identified as a neighbor AP.

At the least, an evil twin AP will mimic the SSID for the AP it is masquerading to be. In this example, the evil twin AP will mimic the SSID for an authorized AP. For example, evil twin AP 110 in FIG. 1 may masquerade as authorized AP 104. In this case, the SSID for the evil twin will be in the protected list, and the logic will proceed to a decision block 514 where a determination is made to whether the beacon (transmitted by the evil twin AP) includes a valid token. This may include determining whether there is a token present, as well as determining a token that is present is invalid. If the token is determined to be valid, then the AP broadcasting the beacon is a trusted AP, as shown in a block 516. Conversely, if the token is missing or is otherwise determined to be invalid, the beacon is being transmitted by an evil twin AP. Accordingly, the answer to decision block 514 and NO, and the logic proceeds to a block 518 that identifies the AP as an evil twin AP and one or more remediation actions are taken. In this example, the one or more remediation actions include sending (via broadcasts) Deauthentication frames (Deauths) to any authenticated clients that are within the broadcast range of the sniffer or a proxy for a sniffer, as depicted in a block 520. For example, a sniffer that is implemented in a stand-alone network element and/or type of element that is not capable of transmitting Deauths may use an authorized AP to transmit the Deauths. In some embodiments in which sniffer functionality is implemented in a trusted AP the trusted AP includes multiple 802.11 radios, with one of the radios being used by the sniffer.

Figure 5A:
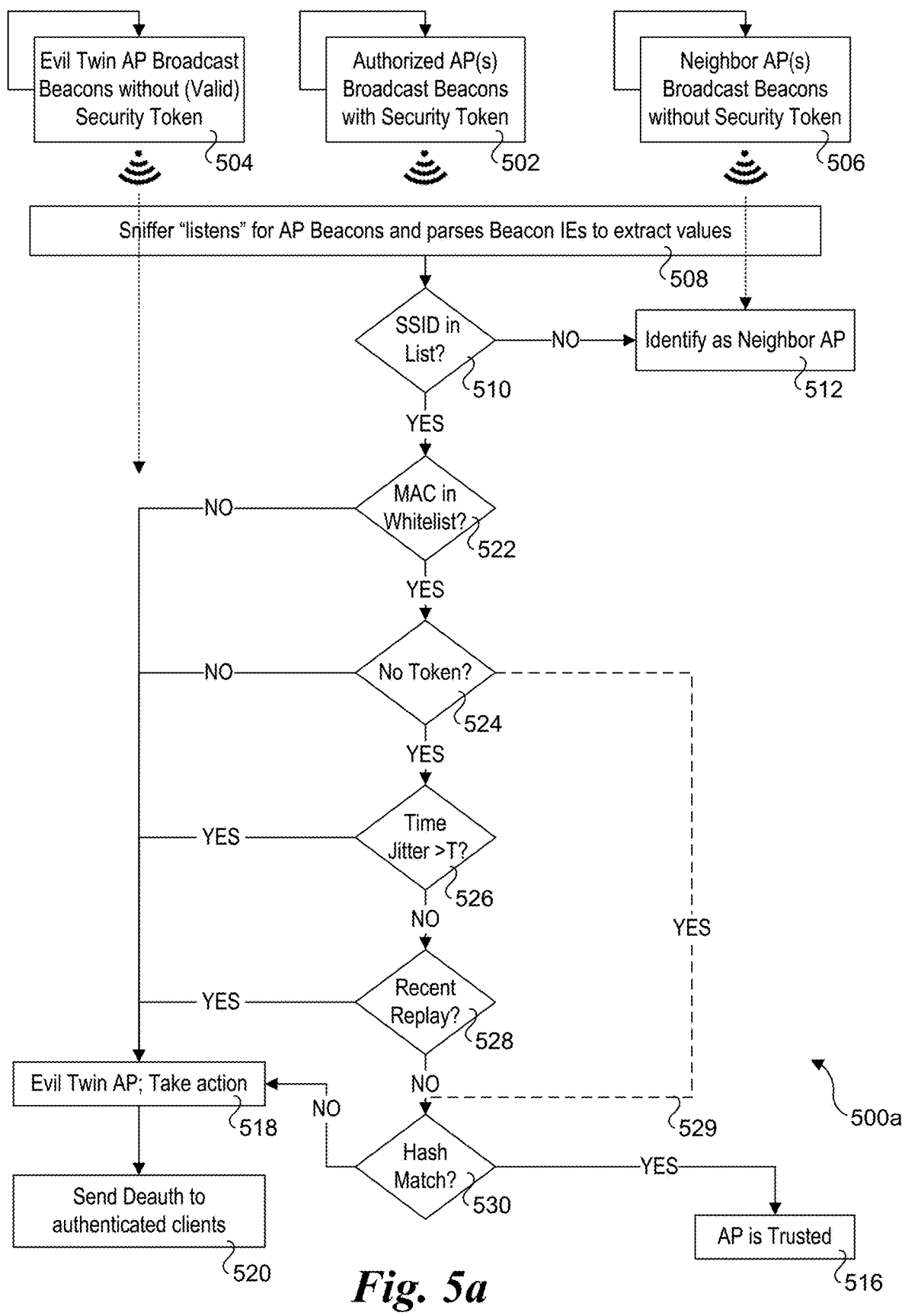
FIG. 5a is a diagram illustrating further operations and logic for detecting an evil twin AP, according to one embodiment.

FIG. 5a shows a diagram 500a illustrating further operations and logic for identifying evil twin APs. Continuating with a YES determination for decision block 510 that the SSID is in the protected list, a determination is made in a decision block 522 whether the MAC address (BSSID) is in a whitelist, or optionally, whether the MAC address is in a protected list separate from the whitelist. In one embodiment, the whitelist will contain a list of trusted APs with their MAC addresses and SSIDs. If the MAC address is not in the whitelist and/or protected list, the AP transmitting the beacon is identified as an evil twin, as depicted by a NO answer to decision block 522 proceeding to block 518. In one embodiment, using a MAC check may be performed with a conventional beacon (frame) that does not include a security token. In other embodiments, the beacon will include a security token.

If the MAC address is in the whitelist or protected list (as applicable), the answer to decision block 522 is YES and the logic proceeds to a decision block 524 to determine whether the beacon includes a security token. If not, the answer to decision block 524 is NO and the logic proceeds to identify the AP transmitting the beacon as an evil twin AP in block 518.

If the beacon includes a security token (or some data in the vendor-specific IE), the answer to decision block 524 is YES, and the logic proceeds to a decision block 526 to determine whether a time jitter event is observed. In one embodiment, time jitter may be determined by a difference between the time at the sniffer and the timestamp in the beacon. For example, each AP will include a clock that generates timestamps that are used for each beacon that is transmitted, with a unique timestamp being included in each beacon. In one embodiment, the sniffer will be either implemented in an authorized AP or communicate with an authorized AP to synchronize its clock with the authorized AP. In some embodiments, all authorized APs (when multiple authorized APs are operating in a shared wireless environment) will synchronize their clocks. In some embodiments the clock synchronization may be out-of-band (e.g., using communications between the APs over an Ethernet LAN or WAN to which each of the authorized APs are connected) using the Network Time Protocol (NTP) or similar protocol, or be in-band using the timestamp and other timing information contained in beacons.

Timestamp field 208 has a length of 8 Octets (64-bits) and the timestamp values may be used for various timing purposes, such as use with timing for MIMO signals, and thus may be very precise (e.g., times are provided in nanosecond increments). If an evil twin AP is mimicking beacon frames being broadcast by an authorized AP, the timestamp will differ from when the authorized AP actually transmitted the beacon, and when this difference in time is greater than some threshold 'T', a time jitter event will be indicated and the answer to decision block 526 will be YES, causing the logic to proceed to identify the AP transmitting the beacon as an evil twin AP.

Depending on the 802.11 PHY, a beacon may include time offset information to enable an evil twin to synchronize its time with an authorized AP and if the evil twin mimics all IEs in beacons transmitted by an authorized AP while substituting its own timestamp, time jitter may not be detected in decision block 526. Accordingly, the answer to decision block 526 is NO and the logic proceeds to a decision block 528 in which a determination to whether a recent replay is detected. For example, if the evil twin repeats transmission of the same beacon, the timestamp value for sequential beacons will be the same. This is an indication of a replay event, since each beacon should have its own unique timestamp. The timestamps should monotonically increase with each subsequent beacon transmission, which may be detected by storing the timestamp for a last (previous) beacon and a new beacon.

If a replay event is detected, the answer to decision block 528 is YES and the logic proceeds to identify the AP transmitting the beacon as an evil twin AP in block 518. If the answer to decision block 528 is NO or if the alternate YES path 529 to decision block 524 is taken, the logic proceeds to determine whether there is a hash match in a decision block 530.

Figure 6:
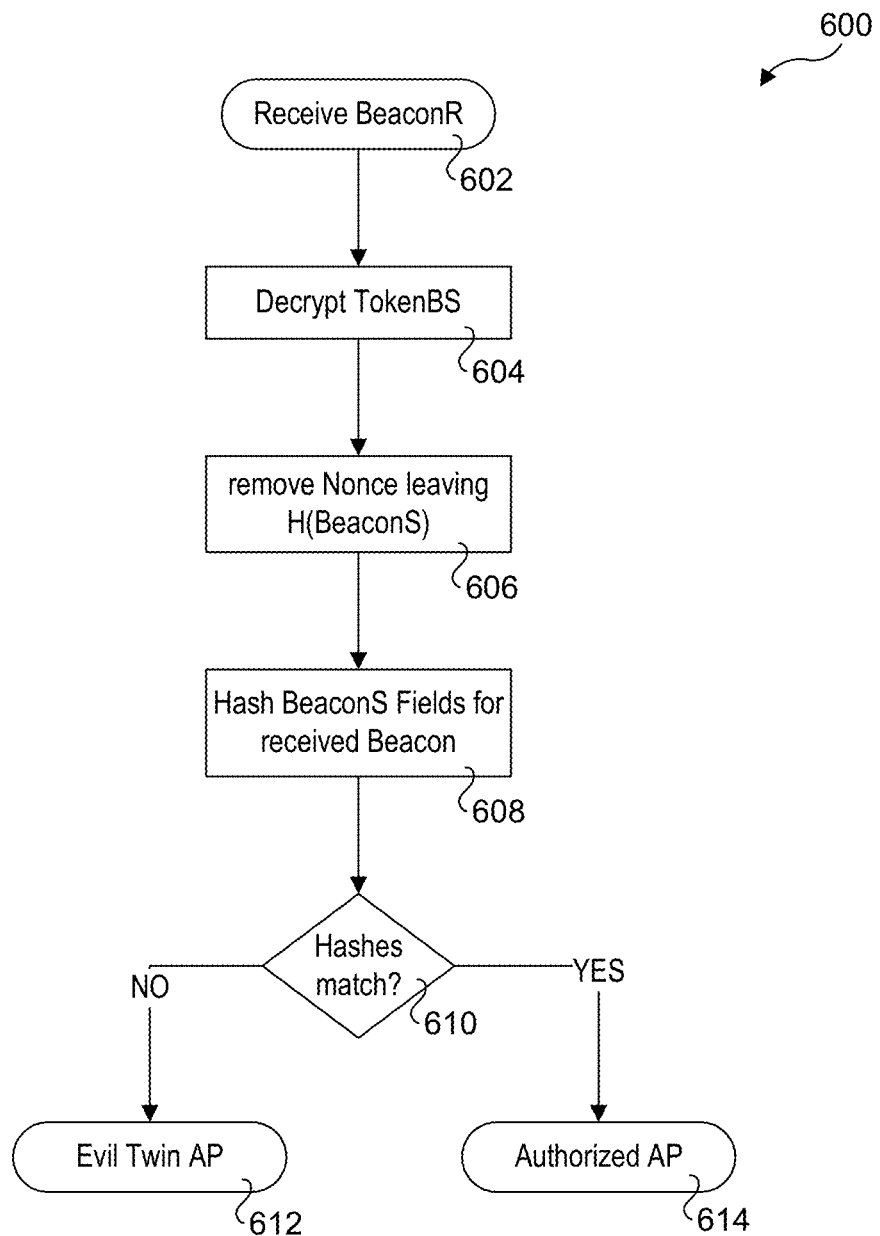
FIG. 6 is a flowchart illustrating operations and logic for validating a security token in a received beacon, according to one embodiment.

FIG. 6 shows a flowchart 600 illustration operations and logic for detecting a hash match, according to one embodiment. The process begins in a start block 602 in which the beacon is received (BeaconR). In a block 604, TokenBS is decrypted from BeaconR. From above, TokenBS 236a is derived from, $$TokenBS=Enc(Nonce\|H(BeaconS),K).$$

An authorized AP has a copy of K, the secret key shared by the authorized APs and authorized clients. Accordingly, key K is used to decrypt Cat(Nonce+H(BeaconS)), and the Nonce is parsed out and removed, leaving H(BeaconS), the digital fingerprint, as shown in a block 606. The sniffer will know 1) which Hash function H is used and 2) what key K to use to generate a digital fingerprint use to authenticate the sender. Thus, the sniffer can apply the same Hash function H and key K to the decrypted BeaconS fields/content in a received beacon (BeaconR) to determine the validity of TokenBS. When $$H(BeaconR)=Dec(TokenBS,K)$$

TokenBS is determined to be valid, and the answer to decision block 610 (and decision block 530 in FIG. 5a) is YES, indicating the AP transmitting the beacon is an authorized AP, as shown in a block 614. Conversely, when $$H(BeaconR)!=Dec(TokenBS,K)$$

the answer to decision blocks 610 and 524 is NO and the logic proceeds to identify the AP transmitting the beacon as an evil twin AP in blocks 612 and 518.

Figure 7:
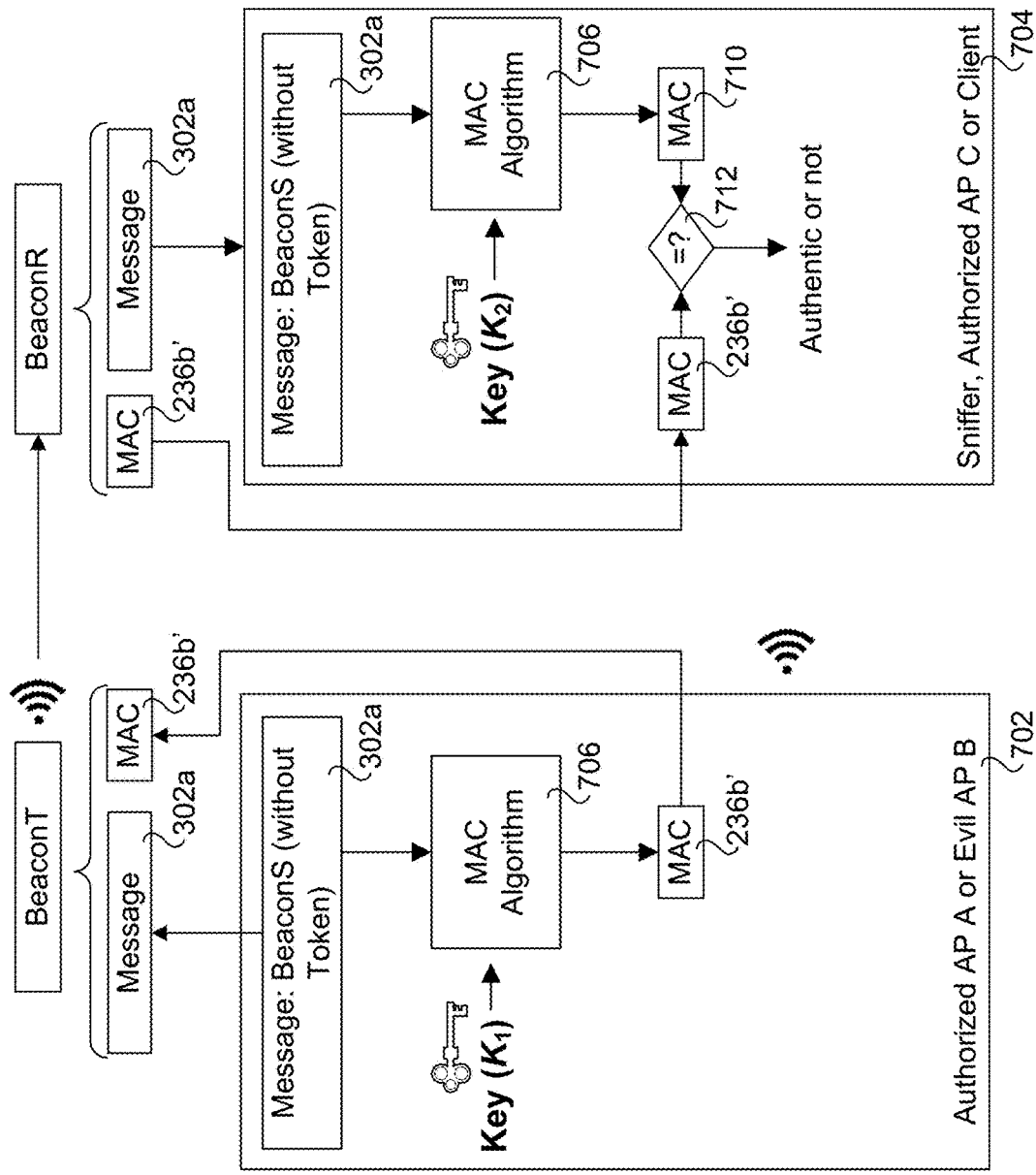
FIG. 7 is a diagram illustrating determination of authenticity for a security token employing a MAC or HMAC.

FIG. 7 illustrates an example of how a TokenBS comprising an HMAC may be implemented to identify evil twin APs. In this example, an AP 702 comprising an authorized AP A or Evil AP B transmits beacons (BeaconT) that are received by a sniffer 704 implemented in a standalone network element, an authorized AP or an authorized client. With reference to beacon 300b in FIG. 3b, TokenBS 236b is determined by $$TokenBS=HMAC(BeaconS,K).$$

As shown in FIG. 7, this corresponds to a MAC 326b', which is generated as follows. The message m for the HMAC algorithm is BeaconS, which in one embodiment is all the IEs in a beacon except the vendor-specific IE that includes the nonce and token. The message is depicted as a message 302a, which is provided as an input to a MAC algorithm 706 that also employs a key $K_1$. For HMAC, MAC algorithm 706 is an HMAC algorithm. The output of MAC algorithm 706 is a MAC 236b' corresponding to TokenBS 236b. Message 302a and MAC 236b' are included in transmitted beacon BeaconT, which is broadcast to and received by sniffer 704, as depicted by received beacon BeaconR. Sniffer Upon receipt of BeaconR, sniffer 704 extracts MAC 236b' and message 302a (i.e., BeaconS). The same MAC algorithm 706 is applied to message 320a with a key $K_2$, with the output of MAC algorithm 706 being a MAC 710. MAC 710 is the compared with MAC 236b' in a decision block 712 to determine if they match. They will match when $K_1=K_2$, and will not match otherwise. Thus, since an evil twin AP does not have $K_1$ or $K_2$ (or otherwise does not have secret key K), MAC 236b' and MAC 610 will not match.

Since the BeaconS fields/content include the timestamp field, TokenBS is a rolling token, meaning each TokenBS is different than its predecessor. This adds another level of security relative to use of the same token. Moreover, the inclusion of nonces can add a further level of security. For example, a predefined nonce pattern may be used that is known to the trusted elements (APs, clients) in a TWE but is unknown to untrusted elements.

Figure 8C:
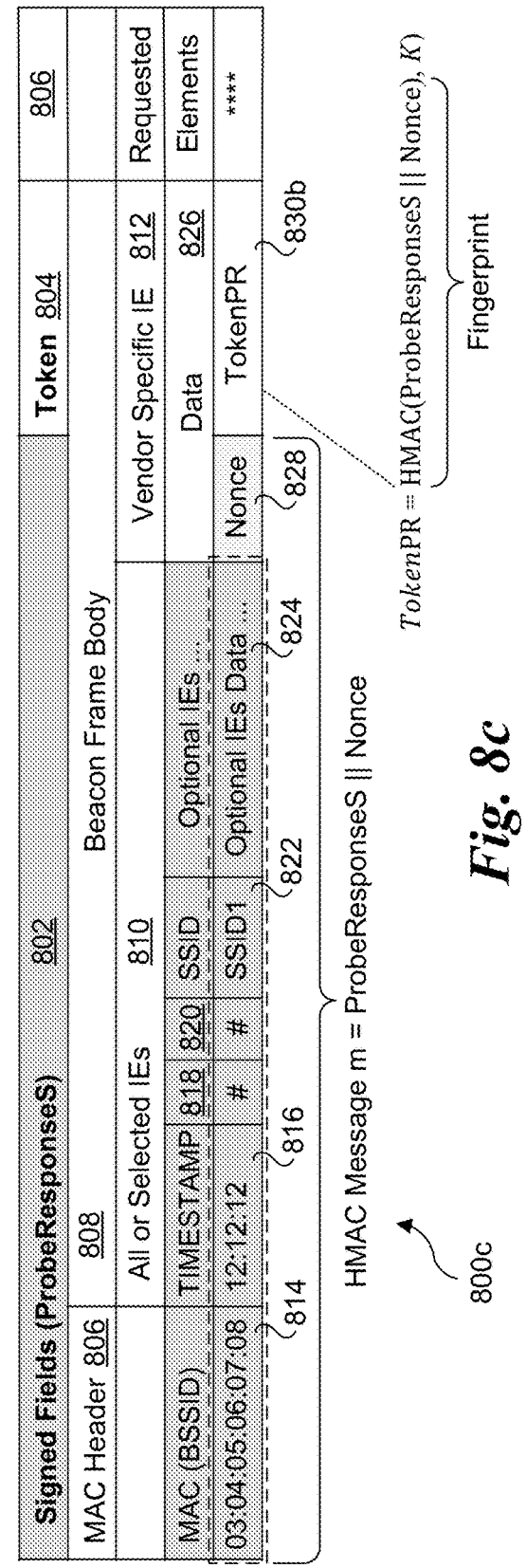
FIG. 8c is a diagram illustrating the format of a trusted probe response, according to a third embodiment.

In addition to beacons, secure tokens may be included in other management frames to validate/authenticate a communicating endpoint, such as an authorized AP or trusted client. In some embodiments these include trusted probe requests and trusted probe responses. FIGS. 8a, 8b, and 8c show respective embodiments of trusted probe responses 800a, 800b, and 800c. Generally, a trusted probe response will have a format for a probe response defined by an applicable IEEE 802.11 MAC protocol standard. For illustrative purposes, only selected IEs of the trusted probe responses are shown; it will be recognized that the actual trusted probe responses would include additional IEs that are not shown for clarity.

As shown in FIG. 8a, trusted probe response 300a includes a set of signed fields referred to as ProbeResponseS 802, followed by a token 804 and (optional) requested elements 806. ProbeResponseS 802 includes the MAC header 806 and the probe response frame body 808, the latter of which includes all or selected IEs 810 and a vendor-specific element 812. Generally, the trusted probe response may include any required IEs, applicable optional IEs (including vendor-specific element 812) and potentially other optional IEs. As shown in for fourth and fifth rows of FIG. 8a these IEs include the MAC address (BSSID) 814, a timestamp 816, beacon interval 818, capability 820, SSID 822, and one or more optional IEs 824 (some of which may be required depending on the IEEE 802.11-based PHY and other settings).

Vendor-specific IE 812 has a similar format to vendor-specific IE 222 in FIG. 2, including a tag number, length, OUI, and type (not shown), followed by a variable length data field 826 that is used for a nonce 828 and a probe response token (TokenPR) 830a. Under trusted probe response 300a, $$TokenPR=Enc(Cat(Nonce+H(ProbeResponseS)),K).$$

The use of TokenPR in a trusted probe response is similar to the use of TokenBS in a trusted beacon presented above.

Trusted probe responses 800*b* and 800*c* have the same format as trusted probe response 800*a*, except the TokenPR is calculated differently. For trusted probe response 800*b*, TokenPR 830*b* is defined as, TokenPR=HMAC(ProbeResponseS),*K*).

For trusted probe response 800*c*, The HMAC for TokenPR 830*c* further includes nonce 828 and is defined as, TokenPR=HMAC(ProbeResponseS||Nonce),*K*).

The operation of TokenPR 830*b* and 830*c* is similar to TokenBR 236*b* and 236*c* presented above.

Figure 9A:
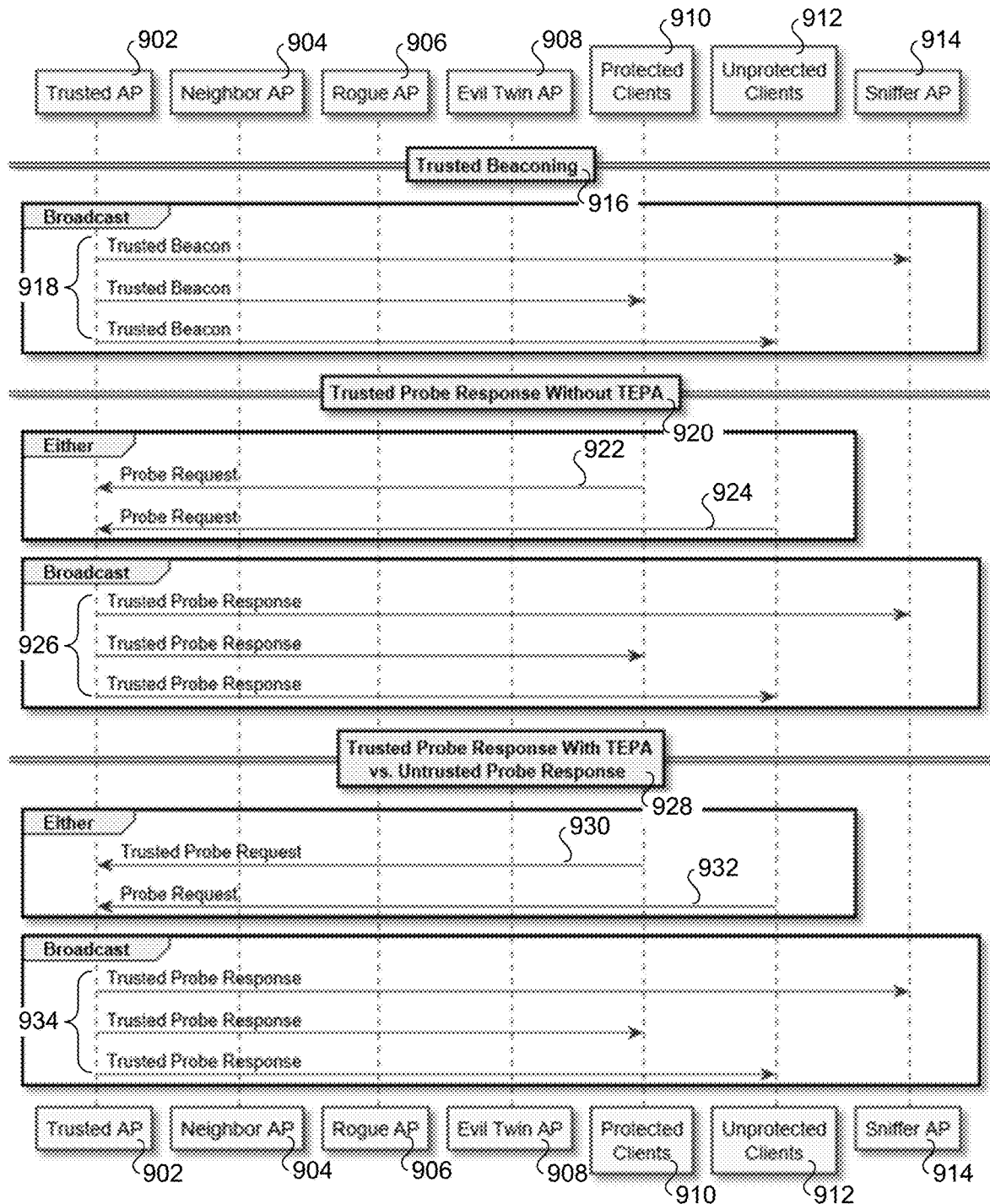
FIG. 9a is a message flow diagram illustrating examples of trusted beaconing and use of trusted probe responses with and without trusted endpoint agents (TEPA)
Figure 9B:
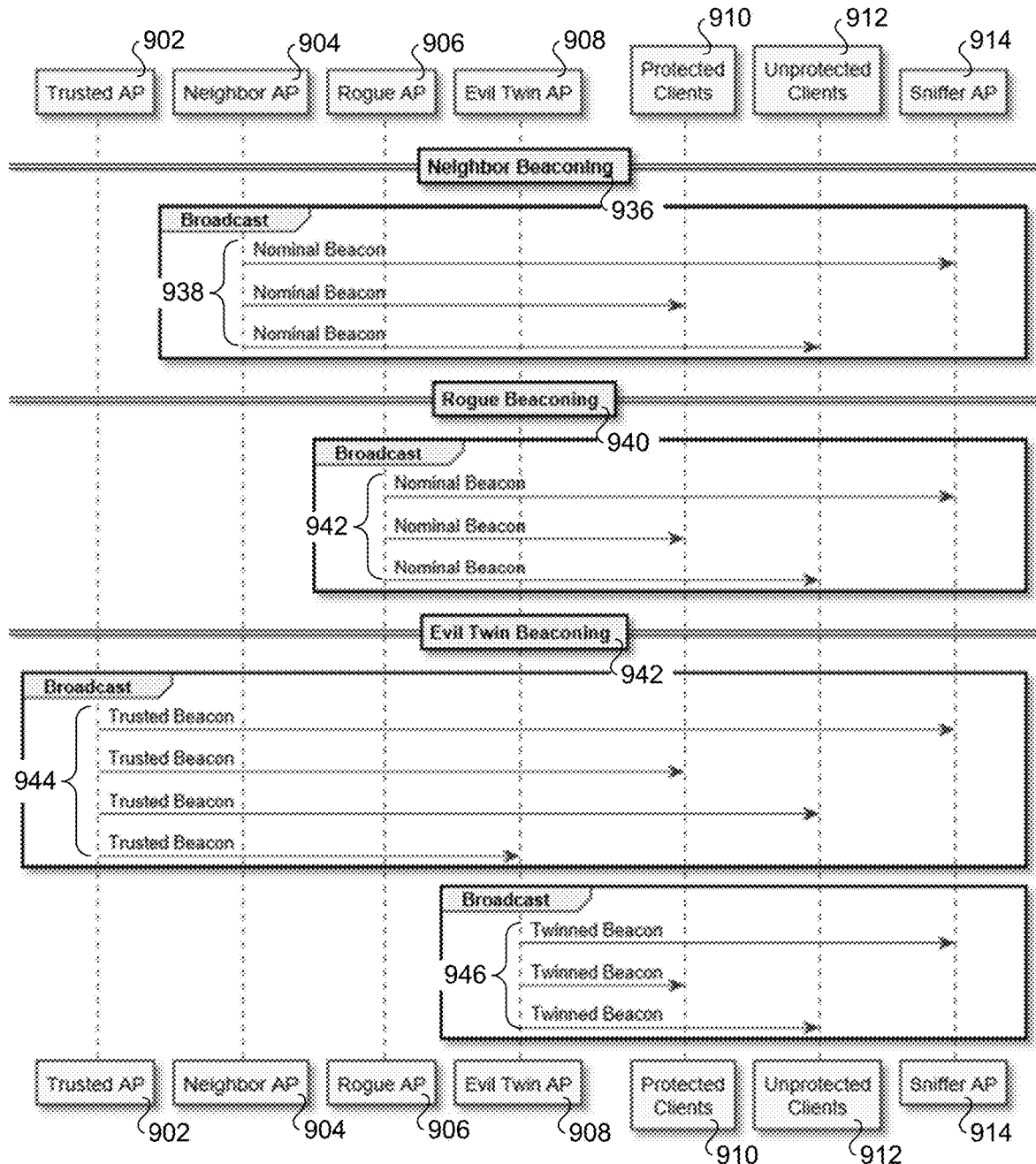
FIG. 9b is a message flow diagram illustrating examples of neighbor beaconing, rogue beaconing, and evil twin beaconing.

FIGS. 9*a* and 9*b* depict various messaging sequences/flows that may be performed in connection with corresponding functions, such as validating an AP, a client, identifying evil twin APs and rogue APs, etc. The "messages" may be in the form of beacons, probe requests, probe responses, and other management frames or packets. In wireless environments, transmissions originating from a device such as an AP or mobile device are nominally broadcast transmissions, where the transmission itself is broadcast onto the shared wireless medium, enabling any device within the signal coverage area to receive the broadcast transmissions. However, it is common practice to refer to a transmission that includes a specific destination (i.e., endpoint device) as a message, packet, frame, etc., while transmissions that do not have a specific destination are referred to as broadcast signals or simply broadcasts. Beacons are examples of such broadcasts; accordingly, in the following Figures including FIGS. 9*a* and 9*b*, the separate signals that are labeled as Broadcast are actually a single broadcast transmission rather than separate transmissions.

As shown at the top and bottom of FIGS. 9*a* and 9*b*, the nodes include a trusted AP 702, a neighbor AP 904, a rogue AP 906, and evil twin AP 908, protected clients 910, unprotected clients 912, and a sniffer AP 914. As discussed above, a sniffer may be implemented on various devices including APs and clients.

Under trusted beaconing 916, trusted AP 902 broadcasts a trusted beacon 918 that is depicted as being received by protected clients 910, unprotected clients 912, and a sniffer AP 914. The trusted beacons may have any of the trusted beacon format discussed herein, including the trusted beacon formats shown in FIGS. 3*a*, 3*b*, and 3*c*.

Trusted probe responses without TEPA correspond to a probe request/response sequence where the probe request is sent to a client device without a TEPA (trusted endpoint agent). Example probe requests 922 and 924 are transmitted from protected clients 910 and unprotected clients 912, respectively, with a destination of trusted AP 902. In response to receiving probe request 922 and/or 924, trusted AP 902 broadcasts a trusted probe response 926, which is depicted as being received by protected clients 910 and unprotected clients 912, and sniffer AP 914. Generally, trusted probe response 926 may have any of the trusted probe response formats discussed herein, such as shown in FIGS. 8*a*, 8*b*, and 8*c*.

Trusted probe responses with TEPA vs. untrusted probe response 928 begins with a protected client transmitting a trusted probe request 930 with a destination of trusted AP 902. An unprotected client 912 transmits a probe request 932 comprising an untrusted probe request with a destination of trusted AP 902. In response to trusted probe request 930, trusted AP 902 broadcasts a trusted probe response 934 that is received by protected clients 910, unprotected clients 912 and sniffer AP 914.

With reference to the top of FIG. 9*b*, neighbor beaconing 936 depicts neighbor AP 904 broadcasting a nominal beacon 938. In this instance, "nominal" means that this is a conventional beacon that does not include the security information (e.g., security token) in the trusted beacons broadcast by trusted AP 902. Similarly, as shown by rogue beaconing 940, rogue AP 904 broadcasts a nominal beacon 942.

Evil twin beaconing 942 illustrates an example of evil twin AP 908 mimicking a trusted beacon 944 broadcast from trusted AP 902. Trusted beacon 944 is then "twinned" by evil twin AP 908 and broadcast as twinned beacon 946.

Figure 10:
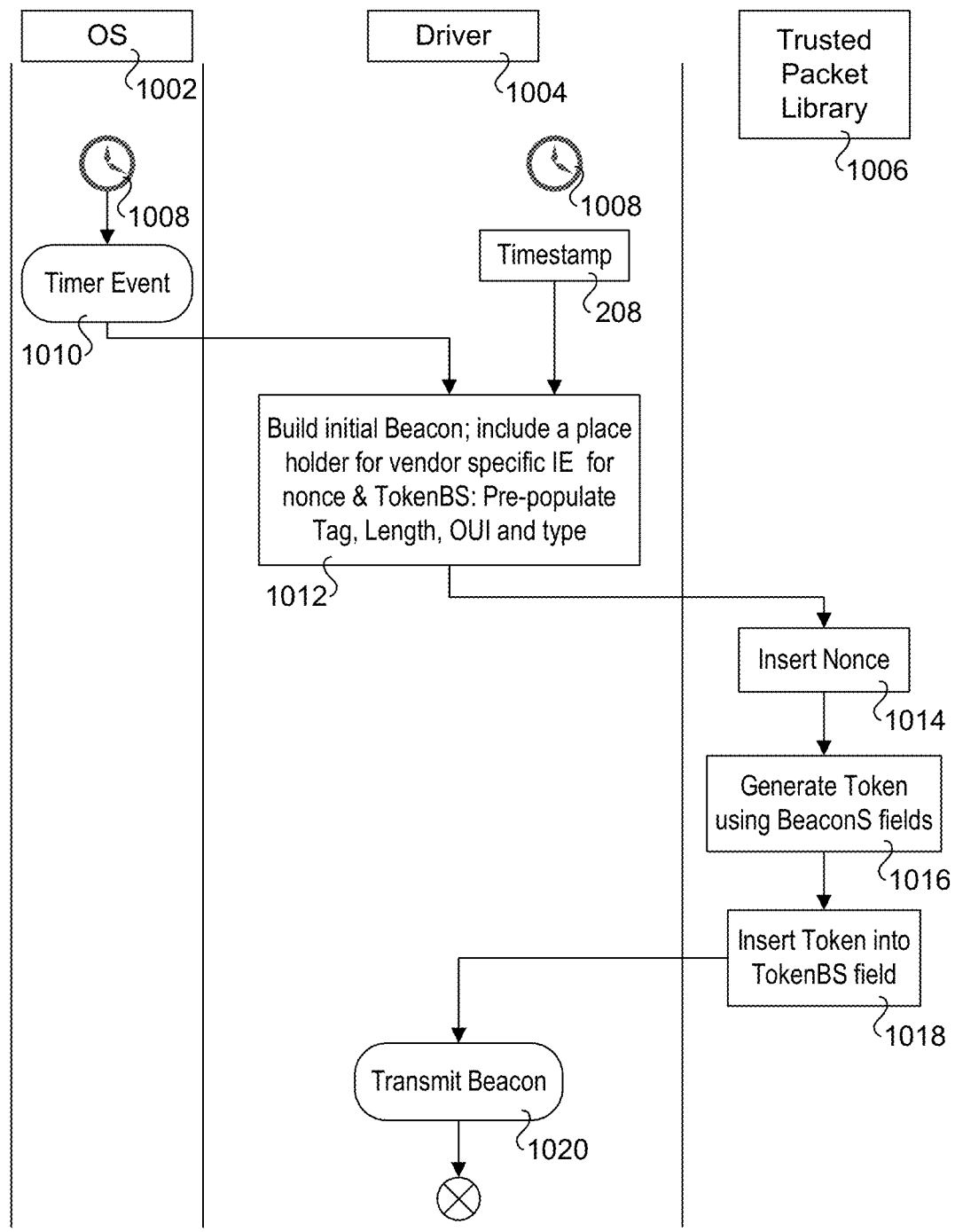
FIG. 10 is a process flow diagram illustrating generation of a trusted beacon, according to one embodiment.

FIG. 10 shows a diagram 1000 illustrating operations for generating and broadcasting a secure beacon, according to one embodiment. The software components include an operating system (OS) 1002, a driver 1004, and a trusted packet library 1006. Generally, the software components will comprise instructions such as software or firmware modules that are executed on a processor.

The beaconing process begins with a timer event 1010 generated by a clock 1008. The frequency of the timer events will be a function of the beacon interval. In response to timer event 1010 an initial beacon frame is built by driver 1004 in a block 1012. The initial beacon frame includes a timestamp 208 generated from clock 1008, and a placeholder for the vendor-specific IE used to store the nonce and the TokenBS. The tag, length, OUI, and type fields for the vendor-specific IE are also pre-populated. The next set of operations is performed by trusted packet library 1006, which inserts a nonce in the beacon frame in a block 1014 and generates the token (i.e., TokenBS) using the BeaconS fields in a block 1016. The generated token is then inserted into the TokenBS field in a block 1018, followed by the beacon being transmitted by driver 1004 in an end block 1020. The scheme used to generate the token in block 1016 can be any of the schemes illustrated in FIGS. 3*a*, 3*b*, and 3*c*.

Figure 11:
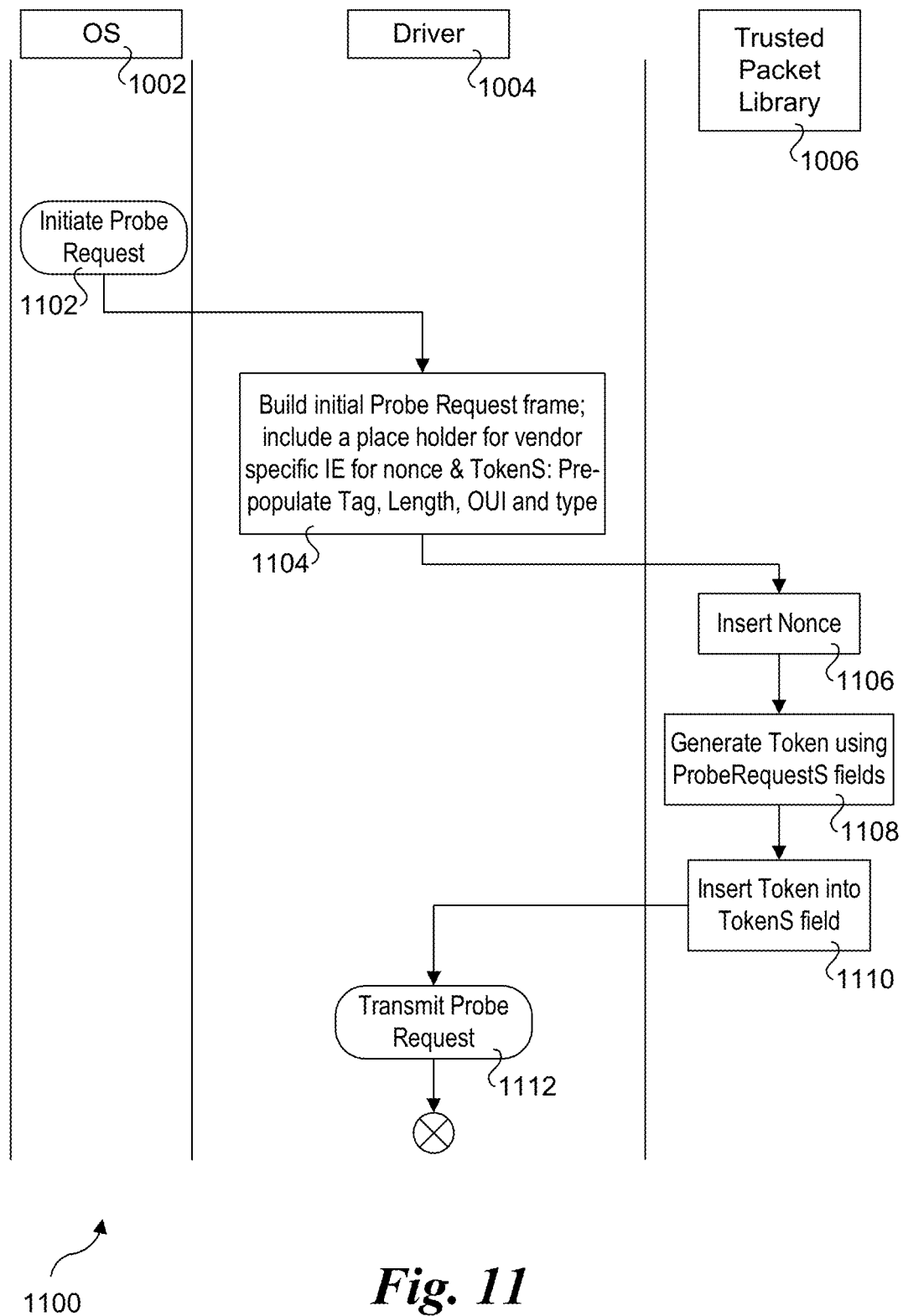
FIG. 11 is a process flow diagram illustrating generation of a trusted probe request, according to one embodiment.

FIG. 11 shows a diagram 1100 illustrating operations for building and sending a trusted probe request, according to one embodiment. The process begins with the OS initiating a trusted probe request in a start block 1102. In a block 1104 the initial trusted probe request frame is built, which includes a placeholder for the vendor-specific IE used to store the nonce and the TokenS. The tag, length, OUI, and type fields for the vendor-specific IE are also pre-populated. Trusted packet library 1006 then inserts a nonce in the probe request frame in a block 1106 and generates the token using the ProbeRequestS fields in a block 1108. The generated token is then inserted into the TokenS field in a block 1110, followed by the trusted probe request frame being transmitted by driver 1004 in an end block 1112.

Figure 12:
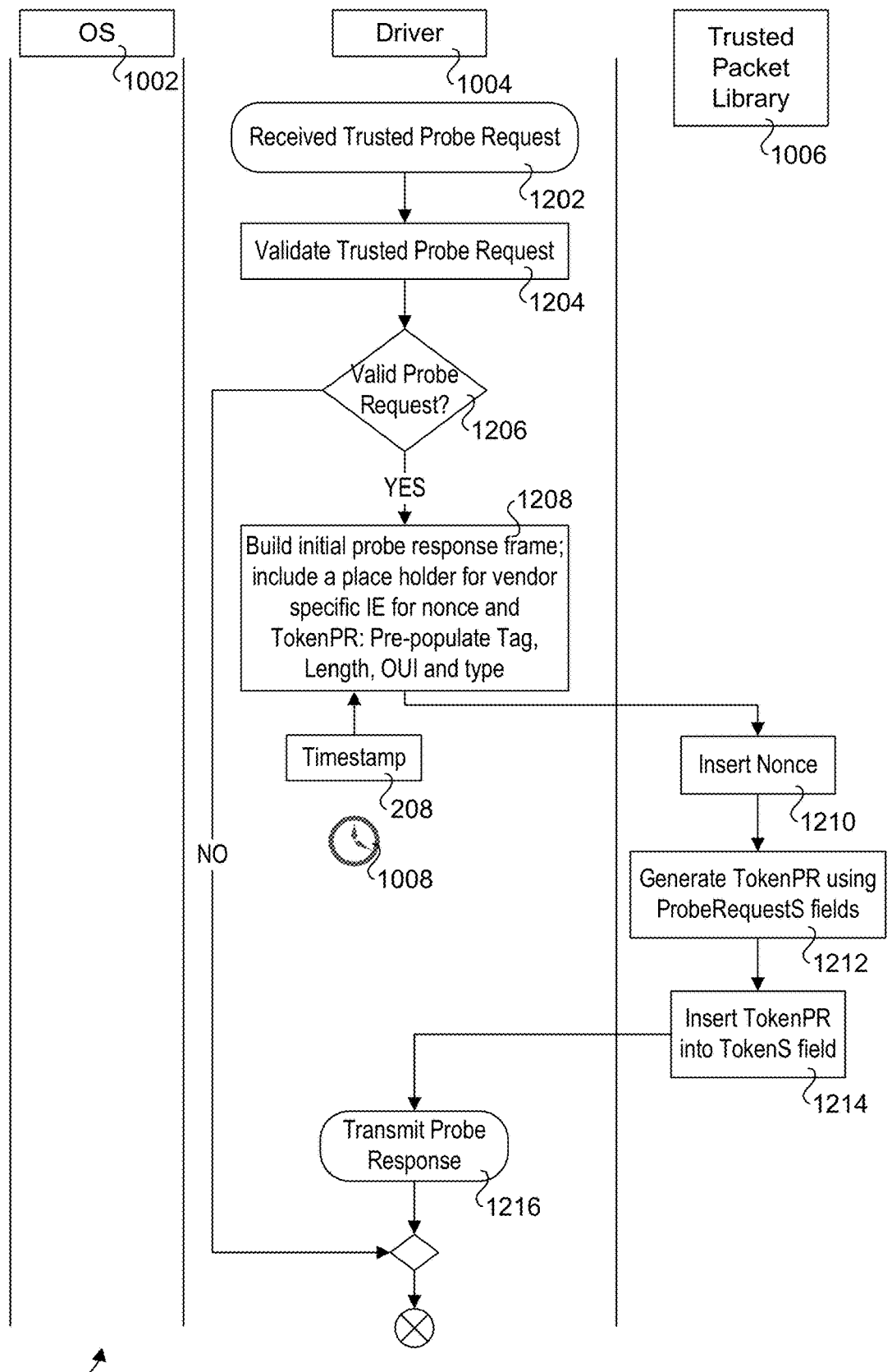
FIG. 12 is a process flow diagram illustrating generation of a trusted probe response, according to one embodiment.

FIG. 12 shows a diagram 1200 illustrating operations for building and sending a trusted probe response, according to one embodiment. The process begins with a trusted probe request being received, as depicted by a start block 1202. The trusted probe request is validated in a block 1204. Validation of the trusted probe request may be performed in a similar manner to validation of the trusted beacons presented above. As depicted by a decision block 1206, when the trusted probe request is valid, the logic proceeds to a block 1208 in which the initial trusted probe response is built, which includes a timestamp 208 generate by clock 1008 and a placeholder for the vendor-specific IE used to store the nonce and the TokenPR, with the tag, length, OUI, and type fields for the vendor-specific IE pre-populated.

The logic next proceeds to trusted packet library 1006 inserting the nonce in a block 1210 and generating TokenPR using the ProbeRequestS fields in a block 1212. TokenPR is then inserted into the TokenS field in a block 1214 followed by transmission of the trusted probe response by driver 1004 in an end block 1216. Returning to decision block 1206, if the probe request is determined to be invalid, the answer to decision block 1206 is NO and the logic proceeds to skip building and transmitting of the trusted probe response. Depending on the circumstances, an invalid probe request may be ignored or otherwise a remediation action may be performed.

Figure 13:
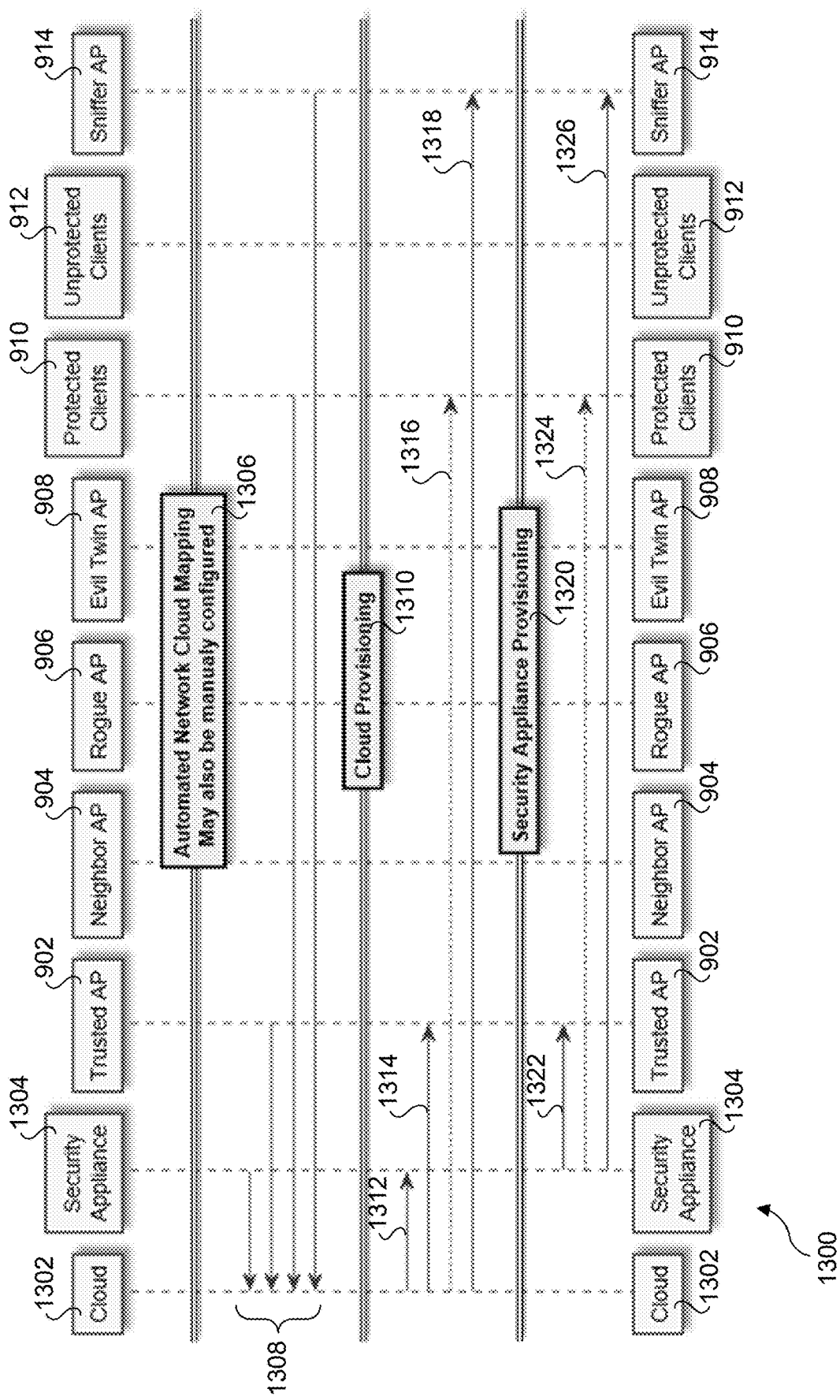
FIG. 13 is a message flow diagram illustrating aspects of cloud-based provision of security data, according to one embodiment.

FIG. 13 shows a message flow diagram 1300 associated with security provisioning (i.e., provisioning of group secret keys, protected SSID lists, EPA certs, etc., such as shown in FIG. 1*a* and discussed above). In addition to the devices shown in the previous Figures, message flow diagram 1300 further includes a cloud 1302 and a security appliance 1304. Cloud 1302 represents a cloud-hosted service or set of services, that may be implemented via a Web service, microservice, Software as a Service (SaaS), etc. In one embodiment a Web service or microservice is implemented using an REST API and JSON, although this is merely exemplary as other types of Web-based service architectures may be used. Security appliance 1304 is representative of any type of security appliance or the like, such as UTM firewall 130 in FIGS. 1 and 1*a*.

As depicted by automatic network cloud mapping 1306, devices that are configured to implement the security measures herein may automatically obtain network cloud mapping information to enable the devices to communicate with cloud 1302, as collectively illustrated by communications 1308. The devices include security appliance 1304, trusted AP 902, protected clients 910 and sniffer AP 914.

Under cloud provisioning 1310, the cloud-hosted service provisions security data comprising appropriate sets of data, keys, lists, certs, etc. to security appliance 1304, trusted AP 902, protected clients 910 and sniffer AP 914, as depicted by respective messages 1312, 1314, 1316, and 1318. Generally, each of security appliance 1304, trusted AP 902, and sniffer AP 914 will have a wired connection to cloud 1302. Meanwhile, protected clients, which are typically wireless client devices, will connect to cloud 1302 over a wireless interface.

As discussed above with reference to FIG. 1*a*, an aspect of provisioning is performed by UMT firewall 130, which corresponds to security appliance 1304 in FIG. 13. As depicted by security appliance provisioning 1320, security appliance 1304 provisions security data/configuration information comprising sets of data, keys, certs, lists, etc. to trusted AP 902, protected clients 910, and sniffer 914, as depicted by messages 1322, 1324, and 1326. For example, trusted AP 902 corresponds to authorized APs 102, 104, and 106 in FIG. 1*a*, where UTM firewall 130 pushes down configuration data 164 to agents 136. When the functionality of a sniffer AP 914 is implemented in a trusted (e.g., authorized) AP, separate provisioning of security data will not be needed.

Figure 14:
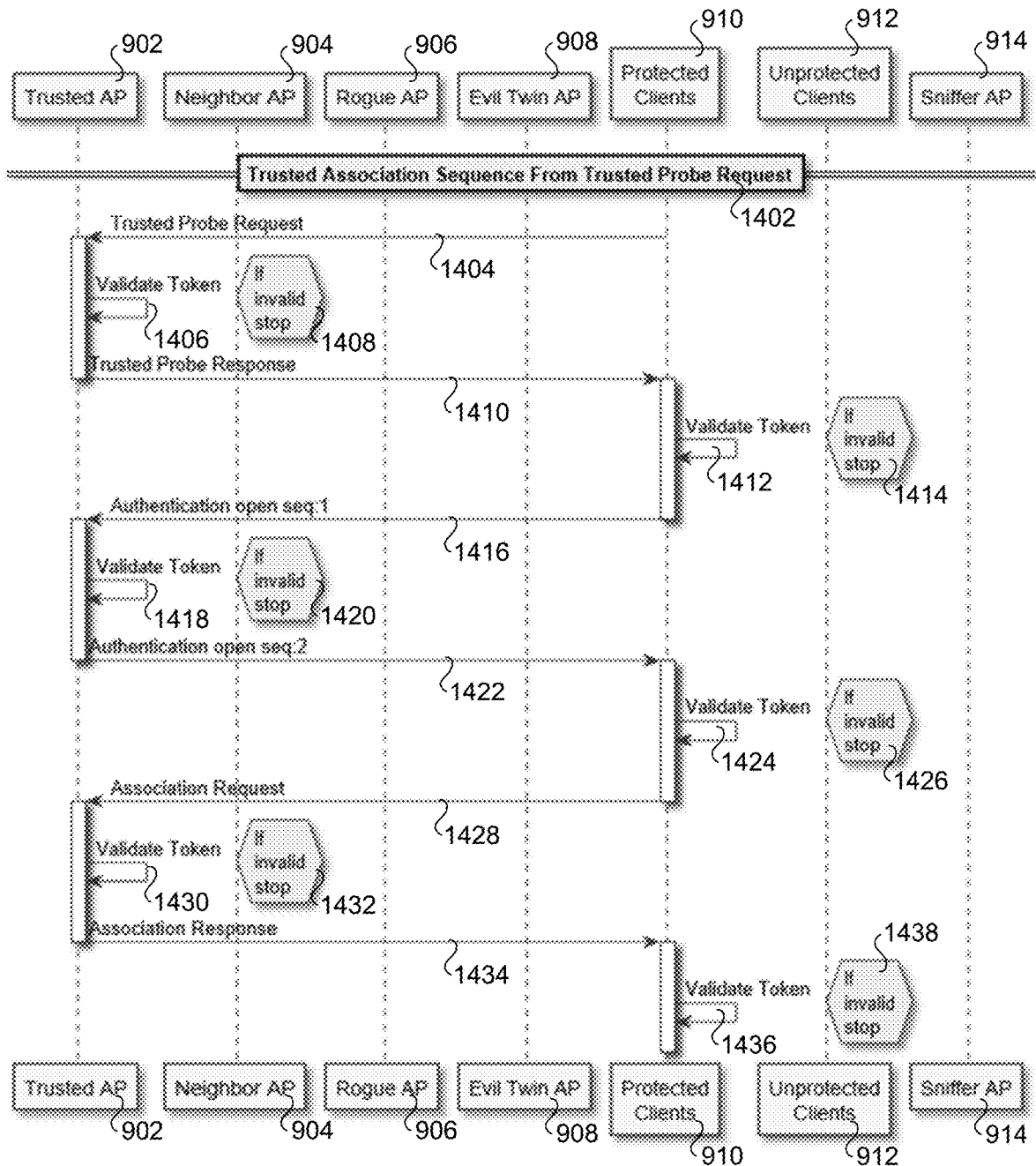
FIG. 14 is a message flow and logic diagram illustrating a trusted association sequence initiated by a trusted probe request, according to one embodiment.

FIG. 14 shows a message flow diagram 1400 related to a trusted association sequence originating from a trusted probe request 1402. Under a trusted association sequence, a protected client 910 obtains an association with a trusted AP. The process begins with a protected client 910 sending a trusted probe request 1404 to trusted AP. As discussed above, the trusted probe request includes a token that is validated by trusted AP 902, as depicted by validate token 1406. If the token is invalid, the sequence stops, as depicted by a decision block 1408. Otherwise (when the token is valid), AP 902 sends a trusted probe response 1410 to protected client 902, which validates the token (1412). If the token is invalid, the sequence stops, as depicted by a decision block 1414.

Under the embodiment illustrated in FIG. 14, a similar security token measure is implemented for each of the remaining messages in the sequence, which include an authentication open seq:1 message 1416, an authentication open seq:2 message 1422, an authentication request 1428, and an association response 1434. As depicted by validate token 1418, 1424, 1430, and 1436, the token in these messages is validated at the recipient (trusted AP 902 or protected client 910 as applicable), and as depicted by decision block 1420, 1426, 1432 and 1438 the sequence is stopped when a token is determined to be invalid (which may also include a missing token). Generally, the format of open seq:1 message 1416, authentication open seq:2 message 1422, authentication request 1428, and association response 1434 may have the format for a management frame shown in FIG. 2*a*, where the token is embedded in a vendor-specific IE 222. The use of a nonce is optional in these messages.

Under variations of message flows for establishing a trusted association between a protected client and a trusted AP, only a portion of the messages contain security tokens. For example, under one embodiment trusted probe request 1404 and trusted probe response 1410 include security tokens, while open seq:1 message 1416, authentication open seq:2 message 1422, authentication request 1428, and association response 1434 do not. The use of security tokens for these messages adds an extra layer of protection but are optional under some embodiments. As other options, security tokens may be included for open seq:1 message 1416 and authentication open seq:2 message 1422 and not included for authentication request 1428 and association response 1434, or security tokens may be included for authentication request 1428 and association response 1434, while be omitted for open seq:1 message 1416, and authentication open seq:2 message 1422.

Figure 15:
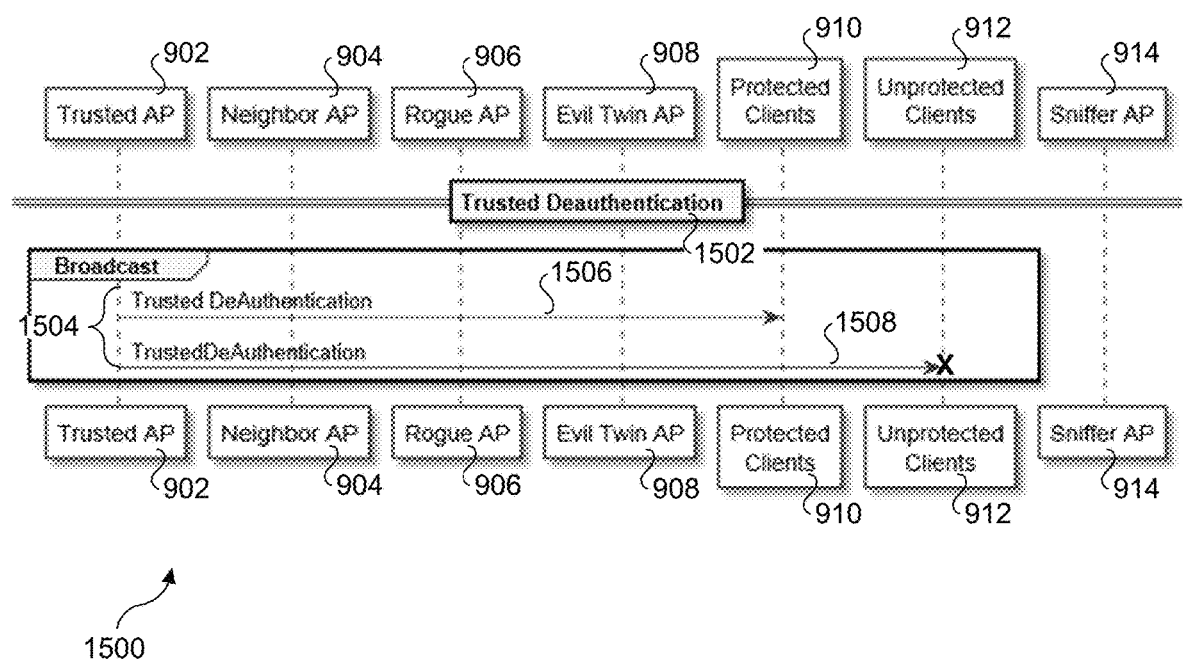
FIG. 15 is a message flow diagram illustrating use of a trusted deauthentication.

FIG. 15 shows a message flow diagram 1500 relating to trusted deauthentication 1502. Trusted deauthentication may be used to deauthenticate clients that have connected evil twin APs by having a trusted AP 902 broadcast trusted deauthentication messages 1504 and 1506 to protected clients 910 and unprotected clients 912. The broadcast trusted deauthentication messages will cause protected clients 910 and unprotected clients 912 to disconnect with an evil twin AP.

In generally, the authentication schemes described herein may be extended to any type of 802.11 frame that includes a vendor-specific IE. In addition, a similar approach may be used for a vendor specific action frame, wherein content in the frame header could be used as the hashed data, and the encrypted content, MAC, or HMAC could be stored in the vendor specific content field.

Exemplary Trusted/Authorized AP

FIG. 15 depicts a block diagram illustrating example components of representative trusted or authorized AP, according to one embodiments. Various components, functional blocks and interfaces are shown with reference to Figure, however, the AP device does not require all of the components, functional blocks, and interfaces for performing the functionality described herein. It is appreciated that, in many embodiments, various components are not included and/or necessary for operation of an AP device. In addition, the AP device can include additional components that are not shown for brevity.

Figure 16:
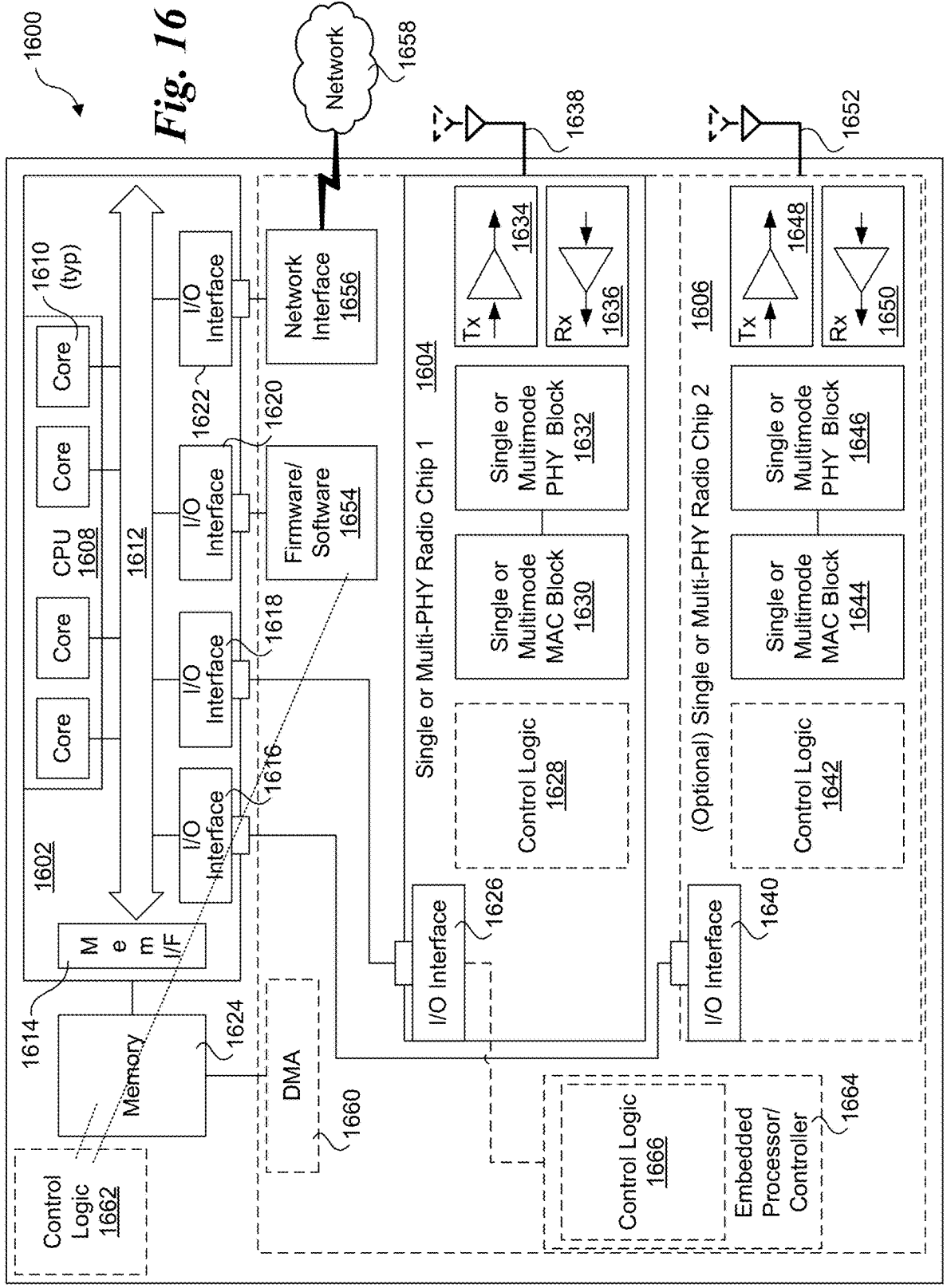
FIG. 16 is a block diagram illustrating example components of a representative wireless device configured to implement aspects of the functionality disclosed herein, in accordance with some embodiments.

As shown in FIG. 16, trusted AP 1600 includes a processor 1602 that is coupled a single or multi-PHY radio chip 1604 and an optional single or multi-PHY radio chip 1606. A multi-PHY radio chip is capable of supporting multiple IEEE 802.11-based PHY protocols. In the illustrated embodiment, processor 1602 includes a CPU (central processor unit) 1608 including one or more cores 1610 coupled to an interconnect 1612. Interconnect 1612, which is representative of one or more levels of interconnects (e.g., in an interconnect hierarchy) is further connected to a memory interface 1614 and Input/Output (I/O) interfaces 1616, 1618, 1620, and 1622. Memory interface 1614 enables the processor to access memory 1624, which generally may be a form of volatile memory, such as Dynamic Random Access Memory (DRAM), or a non-volatile memory, such as, but not limited to flash memory. Memory 1624 may further be implemented as a combination of volatile and non-volatile memory, such as Intel® 3D Xpoint™ memory.

Single or multi-PHY radio chip 1604 includes an I/O interface 1616, a control logic block 1628, a single or multimode MAC block 1630, a single or multimode PHY block 1632, transmitter circuitry 1634, and receiver circuitry 1636. Single or multi-PHY radio chip 1604 is further coupled to an antenna 1638, collectively forming a first radio subsystem. Antenna 1638 is representative of a single or multiple antenna, such as implemented in a MIMO (multiple input, multiple output) radio interface.

Similarly, optional single or multi-PHY radio chip 1606 includes an I/O interface 1640, a control logic block 1642, a single or multimode MAC block 1644, a single or multi-mode PHY block 1646, transmitter circuitry 1648, and receiver circuitry 1650. Single or multi-PHY radio chip 1606 is further coupled to an antenna 1652, collectively forming a second radio subsystem. As before, antenna 1652 is representative of a single or multiple antenna.

A storage device 1654 representing one or more storage devices on which firmware or software is stored, is coupled to processor 1602 via I/O interface 1620. For example, exemplary stored devices including flash memory, solid state drives (SSDs), magnetic media drives, or various other types of storage devices suitable for storing firmware and/or software.

A network interface 1656 is connected to processor 1602 via I/O interface 1622, enabling the wireless device 1600 to access a wired network 1658 using a wire connection. For example, network interface may be an Ethernet interface or Ethernet Network Interface Controller (NIC), an InfiniBand Host Controller Adaptor (HCA), or a network interface in accordance with various other types of wired network standards.

Trusted AP 1600 further is depicted as including an optional direct memory access (DMA) block 1660. DMA block 1660 is representative of DMA functionality that may be provided by wireless device 1600; as will be understood by one skilled in the processor art, DMA functionality is actually implemented via multiple components rather than a single logic or functional block. For example, in one embodiment, at least a portion of the I/O interfaces are PCIe (Peripheral Component Interconnect Express) interfaces, which, along with other circuitry not shown, including a PCIe root complex that would be coupled to interconnect 1612, enable data to be transferred between a component external to processor 1602 (such as one or both single or multi-PHY radio chips 1604 and 1606) and memory 1624 without use of CPU 1608.

Various functionality for the wireless devices described herein may be implemented using "control logic," which is collectively used to refer to logic that may be used to implement corresponding control and communication operations. The control logic may be implemented in one or more components, or in a distributed manner under which portions of the control logic are implemented in different components. For this reason, the various blocks depicting "control logic" are shown in dashed outline, indicating they are optional.

One mechanisms for implementing all or a portion of the control logic is via execution of corresponding firmware or software that is stored in storage device 1654, loaded into memory 1624, and executed on one or more or processor cores 1610, as depicted by control logic 1662. Optionally, all or a portion of the control logic for controlling the PHY and MAC of a given radio subsystem may be implemented on the associated radio chip, such as depicted by control logic 1628 and 1642. As yet another option, separate embedded logic may be used, as depicted by an embedded processor or controller 1664 and control logic 1666. More generally, the embedded logic may be implemented using one of several well-known approaches, such as executing firmware/software on an embedded processor or controller, using an Application Specific Integrated Circuit (ASIC) or a Field Programmable Gate Array (FPGA), or the like. Likewise, control logic 1628 and 1642 may be implemented in a similar manner. In some embodiments, 802.11 radio functionality may be implemented in a Software Defined Radio (SDR).

In some embodiments a dedicated sniffer radio is used for implementing the sniffer functionality described herein. For example, in trusted AP 1600, single or multi-PHY radio chip 1604 may be used for trusted AP 802.11 communication, while single or multi-PHY radio chip 1606 is dedicated for sniffer operations. When a separate 802.11 radio is not used, sniffing may be interleaved with AP traffic using one or more radios.

Exemplary Protected Client

Figure 17:
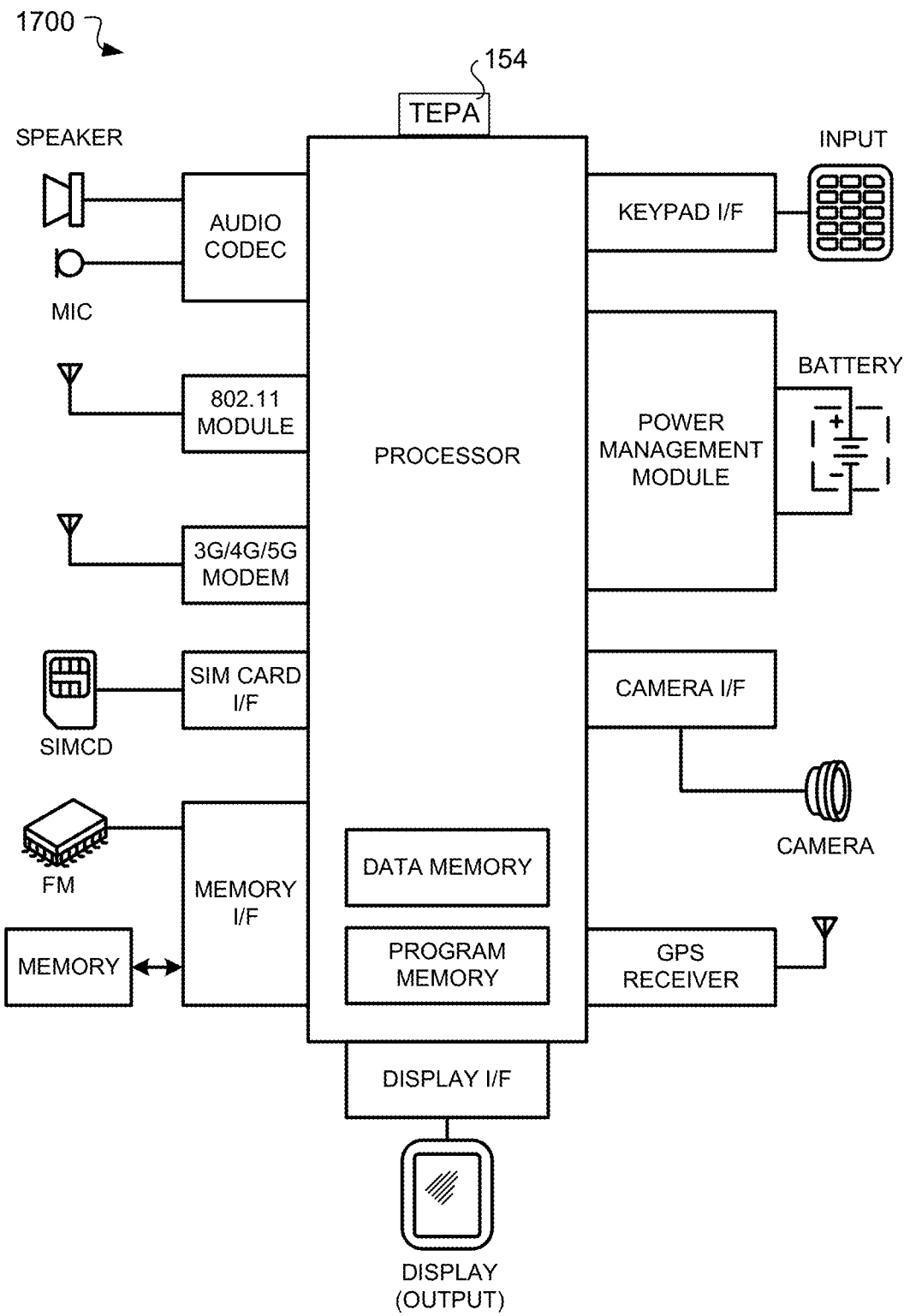
FIG. 17 depicts a block diagram illustrating example components of a representative mobile device that may be implemented as a protected client, in accordance with some embodiments.

FIG. 17 depicts a block diagram illustrating example components of a representative protected client comprising a mobile device 1700 in the form of a mobile (or smart) phone or tablet computer device, according to an embodiment. Various interfaces and modules are shown with reference to FIG. 17; however, the mobile device or tablet computer does not require all of the modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Mobile device 1700 includes software and/or firmware for implemented the functionality associated with protected client devices described herein, including a TEPA 154.

As shown in FIGS. 1 and 1*a*, protected client may also be implemented in a notebook computer or laptop. Notebook and laptop computers may generally include similar components to those shown for mobile device 1700, sans the 3G/4G/5G modem and SIM card and SIM card interface. The notebook and laptop computer components will include a processor or CPU coupled to one or more memory devices in which instructions may be loaded and executed to implement the security functionality described for protected clients comprising notebook and laptop computers disclosed herein. In addition to mobile devices, protected clients may include desktop PCs and workstations and IoT devices.

In some network apparatus, such as APs and clients, the logic illustrated in the various diagrams herein may be implemented using embedded logic, including but not limited to software and/or firmware executed on an embedded processor or one or more processing elements and/or hardware circuitry such as ASICs (application specific integrated circuits and FPGAs (Field Programmable Gate Arrays) and/or other types of programmable logic. As used herein including the claims, the term "logic" applies to logic and operations described and illustrated herein that may be implemented via execution of software or firmware on a processor or one or more processing elements, may be implemented in embedded hardware logic, or may be implemented using a combination of the two.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for detecting an evil twin access point (AP), comprising:
    broadcasting, from a first IEEE 802.11-based AP comprising a trusted AP having a coverage area in which a second AP comprising an IEEE 802.11-based AP is located, a first beacon comprising a trusted beacon including a service set identifier (SSID) for the trusted AP, and containing a security token generated with at least one cryptographic operation employing a secret key and contained in a data field of a vendor-specific information element (IE) in the trusted beacon;
    receiving a second beacon broadcast by the second AP including the SSID and second data in a data field of a second vendor-specific IE;
    processing the security token with the secret key to generate a first value;
    processing the second data in the data field of the second vendor-specific IE of the second beacon with the secret key to generate a second value; and
    detecting the second beacon was broadcast by an evil twin AP when the first and second values do not match.

2. The method of claim 1, wherein the first beacon comprises a header followed by a beacon frame body including a plurality of IEs followed by the vendor-specific IE, and wherein the secure token is generated, at least in part by:
    performing a hash over all data contained in the header and the plurality of IEs before the vendor-specific IE or data contained in at least a portion of the header and selected IEs in the plurality of IEs before the vendor-specific IE to generate a digest; and
    encrypting data including at least the digest using the secret key.

3. The method of claim 2, wherein the data field of the vendor-specific IE further comprises a nonce, and wherein the data that is encrypted with the secret key is composed of the nonce concatenated with the digest.

4. The method of claim 1, wherein the first beacon comprises a header followed by a beacon frame body including a plurality of IEs followed by the vendor-specific IE, and wherein the secure token is generated by employing a MAC (message authentication code) or an HMAC (hash-based message authentication code) algorithm employing the secret key and using a message comprising all data contained in the header and the plurality of IEs before the vendor-specific IE or data contained in at least a portion of the header and selected IEs in the plurality of IEs before the vendor-specific IE.

5. An access point (AP), comprising:
    at least one IEEE 802.11 radio configured to support at least one PHY (Physical layer) and MAC (Media Access Channel layer) defined by an IEEE 802.11 PHY standard;
    a processor, operatively coupled to the at least one IEEE 802.11 radio;
    memory, coupled to the processor; and
    logic configured to,
        generate a security token using at least one cryptographic operation employing a secret key;
        broadcast a first beacon comprising a trusted beacon including a service set identifier (SSID) for the AP and containing the security token in a data field of a vendor-specific information element (IE) in the first trusted beacon;
        receive a second beacon broadcast by the second AP including the SSID and second data in a data field of a second vendor-specific IE;
        process the security token with the secret key to generate a first value;
        process the second data in the data field of the second vendor-specific IE of the second beacon with the secret key to generate a second value; and
        detect the second beacon was broadcast by an evil twin AP when the first and second values do not match.

6. The AP of claim 5, wherein the first beacon comprises a header followed by a beacon frame body including a plurality of IEs followed by the vendor-specific IE, and wherein the secure token is generated by:
    employing a hash or cryptographic hash over all data contained in the header and the plurality of IEs before the vendor-specific IE or data contained in at least a portion of the header and selected IEs in the plurality of IEs before the vendor-specific IE to create a digest; and
    encrypting data including at least the digest using the secret key.

7. The AP of claim 6, wherein the data field of the vendor-specific IE further comprises a nonce, and wherein the data that is encrypted with the secret key is composed of the nonce concatenated with the digest.

8. The AP of claim 5, wherein the first beacon comprises a header followed by a beacon frame body including a plurality of IEs followed by the vendor-specific IE, and wherein the secure token is generated by employing a MAC (message authentication code) or an HMAC (hash-based message authentication code) algorithm employing the secret key and using a message comprising all data contained in the header and the plurality of IEs before the vendor-specific IE or data contained in at least a portion of the header and selected IEs in the plurality of IEs before the vendor-specific IE.

9. A non-transitory machine-readable medium having instructions stored thereon comprising one or more software modules that are configured to be executed on a processor in a first IEEE 802.11 access point (AP) to enable the first IEEE 802.11 AP to:
    generate a security token using at least one cryptographic operation employing a secret key;
    generate a beacon frame including a service set identifier (SSID) for the first IEEE 802.11 AP and including the security token in a data field of a vendor-specific information element (IE) of the beacon frame, the beacon frame to be broadcast as a first beacon comprising a trusted beacon by the first IEEE 802.11 AP;
    examine content in multiple information elements (IEs) in a second beacon that is broadcast by a second IEEE 802.11 AP and received by the first IEEE 802.11 AP, the second beacon including the SSID and second data in a data field of a second vendor-specific IE;
    process the security token with the secret key to generate a first value;

process the second data in the data field of the second vendor-specific IE of the second beacon with the secret key to generate a second value; and detect the second beacon was broadcast by an evil twin AP when the first and second values do not match.

10. The non-transitory machine-readable medium of claim 9, wherein the first beacon comprises a header followed by a beacon frame body including a plurality of IEs followed by the vendor-specific IE, and wherein the secure token is generated by:

employing a hash or cryptographic hash over all data contained in the header and the plurality of IEs before the vendor-specific IE or data contained in at least a portion of the header and selected IEs in the plurality of IEs before the vendor-specific IE to create a digest; and encrypting data including at least the digest using the secret key.

11. The non-transitory machine-readable medium of claim 10, wherein the data field of the vendor-specific IE further comprises a nonce, and wherein the data that is encrypted with the secret key is composed of the nonce concatenated with the digest.

12. The non-transitory machine-readable medium of claim 9, wherein the first beacon comprises a header followed by a beacon frame body including a plurality of IEs followed by a vendor-specific IE, and wherein the secure token is generated by employing a MAC (message authentication code) or an HMAC (hash-based message authentication code) algorithm employing the secret key and using a message comprising all data contained in the header and the plurality of IEs before the vendor-specific IE or data contained in at least a portion of the header and selected IEs in the plurality of IEs before the vendor-specific IE.

* * * * *